US008830493B2

(12) United States Patent
Ito et al.

(10) Patent No.: US 8,830,493 B2
(45) Date of Patent: Sep. 9, 2014

(54) COMPUTER READABLE INFORMATION RECORDING MEDIUM STORING PRINTING CONTROL PROGRAM, PRINTING CONTROL APPARATUS, PRINTING CONTROL METHOD AND PRINTING SYSTEM

(75) Inventors: Yoshikazu Ito, Kanagawa (JP); Takao Suzuki, Tokyo (JP); Tatsuya Ishikawa, Tokyo (JP); Yusuke Karube, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 184 days.

(21) Appl. No.: 13/360,042

(22) Filed: Jan. 27, 2012

(65) Prior Publication Data
US 2012/0194841 A1 Aug. 2, 2012

(30) Foreign Application Priority Data

Feb. 1, 2011 (JP) .................................. 2011-020218
Jan. 20, 2012 (JP) .................................. 2012-010242

(51) Int. Cl.
*G06F 3/12* (2006.01)

(52) U.S. Cl.
USPC ........................................ 358/1.13; 358/1.15

(58) Field of Classification Search
None
See application file for complete search history.

(56) References Cited

U.S. PATENT DOCUMENTS

| 7,929,157 | B2 | 4/2011 | Nakagiri |
| 2003/0006027 | A1 | 1/2003 | Jenkins |
| 2008/0079973 | A1* | 4/2008 | Beus et al. .................. 358/1.13 |
| 2009/0147290 | A1 | 6/2009 | Tomita |
| 2009/0262395 | A1* | 10/2009 | Kanamoto .................. 358/1.15 |
| 2009/0279124 | A1* | 11/2009 | Liu et al. .................... 358/1.15 |
| 2009/0279126 | A1 | 11/2009 | Williams |

FOREIGN PATENT DOCUMENTS

| JP | 2003-091384 A | 3/2003 |
| JP | 2009-145998 A | 7/2009 |
| JP | 2009-271927 A | 11/2009 |
| JP | 2009-271929 A | 11/2009 |

* cited by examiner

*Primary Examiner* — Steven Kau
*Assistant Examiner* — Neil R McLean
(74) *Attorney, Agent, or Firm* — Harness, Dickey & Pierce, P.L.C.

(57) ABSTRACT

A computer readable information recording medium stores a printing control program. The printing control program, when executed by one or plural processors, functions of a first conversion function part configured to derive data of a form of page description language converted from printing data, based on the printing data; a second conversion function part configured to disassemble the data of the form of page description language converted from the printing data and data to be inserted into the data of the form of page description language converted from the printing data, and derive disassembled printing output data, based on data of a form of job definition format associated with the printing data and the data of the form of page description language converted from the printing data; and a transmission function part configured to transmit the disassembled printing output data to a printer apparatus.

13 Claims, 25 Drawing Sheets

FIG.8A (PAPER SETTINGS SETTABLE FOR EACH TRAY)

TRAY 1
 ・PAPER SIZE: A4, B4
 ・PAPER TYPE: PLAIN PAPER, GLOSSY PAPER,
   COLORED PAPER, CARDBOARD
TRAY 2
 ・PAPER SIZE: A4, B4, A3
 ・PAPER TYPE: PLAIN PAPER, GLOSSY PAPER,
   COLORED PAPER, CARDBOARD

FIG.8B (PAPER SETTING CURRENTLY SET IN EACH TRAY)

TRAY 1
 ・PAPER SIZE = A4
 ・PAPER TYPE = PLAIN PAPER
TRAY 2
 ・PAPER SIZE = A3
 ・PAPER TYPE = COLORED PAPER

FIG.10A

BEFORE CONVERSION

| ATTRIBUTE | PARAMETER |
|---|---|
| WEIGHT | 72 |
| COLOR NAME | BLUE |
| TEXTURE | LIGHT COCKLE |
| TYPE OF HOLE | S (NORMAL) |
| TYPE | PAPER |
| OPACITY | SEMITRANSPARENT |
| ALREADY PRINTED | YES |
| % (RATIO OF RECYCLED PAPER) | 10 |
| COATING (FRONT SIDE) | NO |

FIG.10B

AFTER CONVERSION

| ATTRIBUTE | PARAMETER |
|---|---|
| PAPER TYPE | RECYCLED PAPER |

FIG.11A

BEFORE CONVERSION

| ATTRIBUTE | PARAMETER |
|---|---|
| WEIGHT | 72 |
| COLOR NAME | BLUE |
| TEXTURE | LIGHT COCKLE |
| TYPE OF HOLE | S (NORMAL) |
| TYPE | PAPER |
| OPACITY | SEMITRANSPARENT |
| ALREADY PRINTED | YES |
| % (RATIO OF RECYCLED PAPER) | 0 |
| COATING (FRONT SIDE) | NO |

FIG.11B

AFTER CONVERSION

| ATTRIBUTE | PARAMETER |
|---|---|
| PAPER TYPE | ALREADY PRINTED |

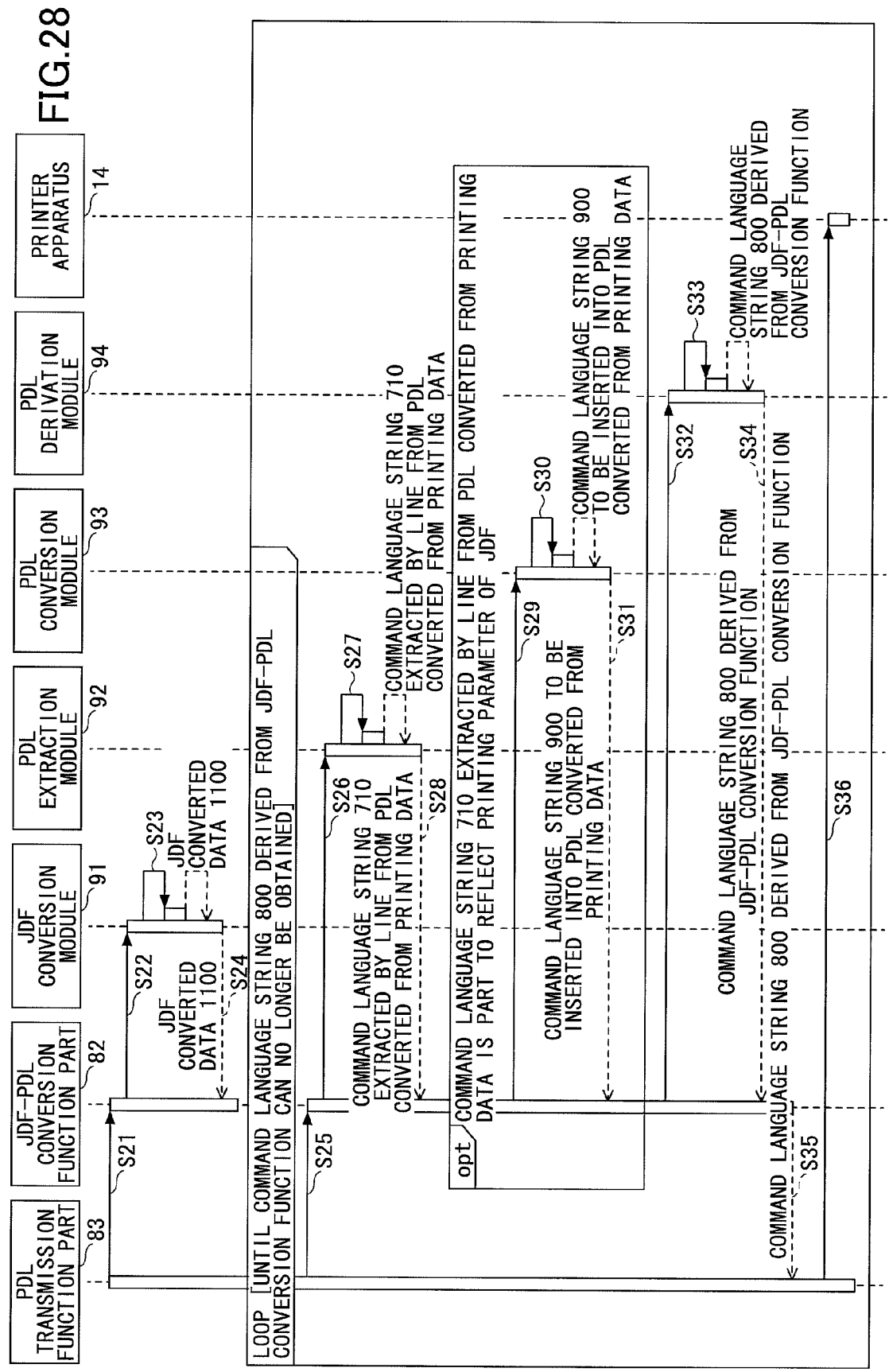

COMPUTER READABLE INFORMATION RECORDING MEDIUM STORING PRINTING CONTROL PROGRAM, PRINTING CONTROL APPARATUS, PRINTING CONTROL METHOD AND PRINTING SYSTEM

BACKGROUND OF THE INVENTION

1. Field of the Invention

The present invention relates to a computer readable information recording medium storing a printing control program, a printing control apparatus, a printing control method and a printing system, using a job definition format (JDF).

2. Description of the Related Art

A company in the commercial printing industry, which receives printed pages (a catalog, an advertisement or the like) from a customer, generates printed output pages requested by the customer from the printed pages, delivers the thus generated printed output pages to the customer and receives a payment from the customer, carries out plural processes from the reception of the printed pages to the delivery of the printed output pages. The plural processes from the reception of the printed pages to the delivery of the printed output pages include, for example, a reception of printed pages from the customer, a reception of printing conditions for the printed output pages from the customer, a prepress process such as a color change, a layout change and a binding position change, proofing for the customer to check the prepress result, a printing process, a post-press process (post-process) such as binding the printed output pages, compression bonding of the printed output pages or the like after the printing process, and delivery of the printed output pages to the customer. It is noted that the plural processes from the reception of the printed pages to the delivery of the printed output pages may increase or decrease depending on the printing conditions for the printed output pages requested by the customer.

In the related art of the commercial printing industry, there are many orders from customers to carry out printing in large quantities, and the above-mentioned plural processes from the reception of the printed pages to the delivery of the printed output pages, for example, are carried out to execute the many orders. Further, in many cases, for such orders of printing in large quantities, printing conditions from customers for printed output pages are fixed. Therefore, in the commercial printing industry in the related art, printed output pages requested by customers are generated through cycles in which a large quantity (lot) of printing is carried out according to fixed printing conditions, and after the printing for the lot is finished, another lot of printing is carried out after the printing conditions are changed.

In the printing cycles, the above-mentioned plural processes from the reception of the printed pages to the delivery of the printed output pages are carried out in many cases when printing conditions from customers for printed output pages are changed. Therefore, in a case where printing conditions from customers for printed output pages are not changed, a commercial printer can carry out printing continuously according to the fixed printing conditions, and thus, it is possible to carry out printing in large quantities with high efficiency.

Recently, a print on demand (POD) market has appeared in which a commercial printer delivers a relatively small lot of printed output pages to a customer with a short delivery time. In the POD market, orders from plural customers are received in many cases. As a result, in the POD market, in many cases, printed pages sent to a commercial printer from customers include many different types of printed pages, or printing conditions requested by the customers for printed output pages include many different conditions.

Furthermore, recently, digitizing of printed pages has flourished, and a computer has been used to control the generation of printed output pages. For example, workflow techniques of sending printed pages from a customer in a form of electronic data to a printer via a communication network and/or controlling the above-mentioned plural processes from reception of printed pages to delivery of printed output pages have appeared. For example, according to the workflow techniques, there is a configuration in which printing operations in the above-mentioned plural processes from reception of printed pages to delivery of printed output pages are defined by JDF, and the printing operations are controlled in a printing system.

JDF is a standard widely used for providing information concerning processing of a print job. JDF is based on extensible markup language (XML). Data having a JDF form (hereinafter, simply referred to as JDF) is usually included in an object file called a job ticket.

JDF is associated with printing data for a print job by a description in a job ticket. JDF included in a job ticket includes any number of JDF elements. JDF elements are organized as a hierarchical tree structure. JDF elements define printing parameters concerning a print job for printing.

Some printing parameters may be designated by plural branches of the hierarchical structure. Further, some printing parameters may be designated in an equivalent form using any of plural duplicate JDF elements in the hierarchical structure.

As examples of printing parameters, paths for resources, rendering parameters, layout options, other available printing options, and media parameters for printing, may be cited. Paths for resources identify printing data to be used for printing. Rendering parameters indicate options for rendering various targets concerning a print job. Layout options include, for example, N-up, duplex, and so forth. Media parameters include, for example, a size, a weight, a color and the forth of a sheet of paper to be used for printing.

Many existing printer apparatuses do not support functions that directly process JDF. However, existing printer apparatuses support functions that process data having a form of page description language (PDL) (hereinafter, simply referred to as PDL).

For example, techniques of converting JDF into PDL for the purpose that existing printer apparatus can use JDF are known (for example, see Japanese Laid-Open Patent Application No. 2009-271927).

SUMMARY OF THE INVENTION

According to an aspect of the present invention, a computer readable information recording medium stores a printing control program. The printing control program performs, when executed by one or plural processors, functions of a first conversion function part configured to derive data of a form of page description language converted from printing data, based on the printing data; a second conversion function part configured to disassemble the data of the form of page description language converted from the printing data and data to be inserted into the data of the form of page description language converted from the printing data, and derive disassembled printing output data, based on data of a form of job definition format associated with the printing data and the data of the form of page description language converted from the printing data; and a transmission function part configured to transmit the disassembled printing output data to a printer apparatus.

It is noted that a method, an apparatus, a system, a computer program, a computer readable information recording medium, a data structure, or the like, to which elements or expressions of the aspect of the present invention or any combinations of the elements are applied, are also effective as embodiments of the present invention.

Other objects, features and advantages of the present invention will become more apparent from the following detailed description when read in conjunction with the accompanying drawings.

BRIEF DESCRIPTION OF THE DRAWINGS

FIGS. 8A and 8B illustrate one example of information of device capabilities reported from the printer apparatus to the printing control PC;

FIGS. 10A and 10B show an image of one example of paper settings before and after the conversion in step S4 in FIG. 9;

FIGS. 11A and 11B show an image of another example of paper settings before and after the conversion in step S4 in FIG. 9;

FIG. 28 is a sequence diagram of one example of details of the processing of the JDF-PDL conversion function part and the PDL transmission function part.

DETAILED DESCRIPTION OF THE PREFERRED EMBODIMENTS

According to the above-mentioned techniques of converting JDF into PDL for the purpose that an existing printer apparatus can use JDF, a first print out time (FPOT) is not so short, because after conversion of JDF into PDL is finished, the converted PDL is transmitted to a printer apparatus. FPOT is a time period required from when a printing start instruction is given until when a first sheet of paper (i.e., a printed output page) is ejected to a tray.

An embodiment of the present invention has been devised in consideration of the problem, and an object of the embodiment of the present invention is to provide a computer readable information recording medium storing a printing control program, a print control apparatus, a printer control method and a printing system, by which FPOT can be shortened.

Next, embodiments of the present invention will be described with reference to figures.

[First Embodiment]

<System Configuration>

Figure 1:
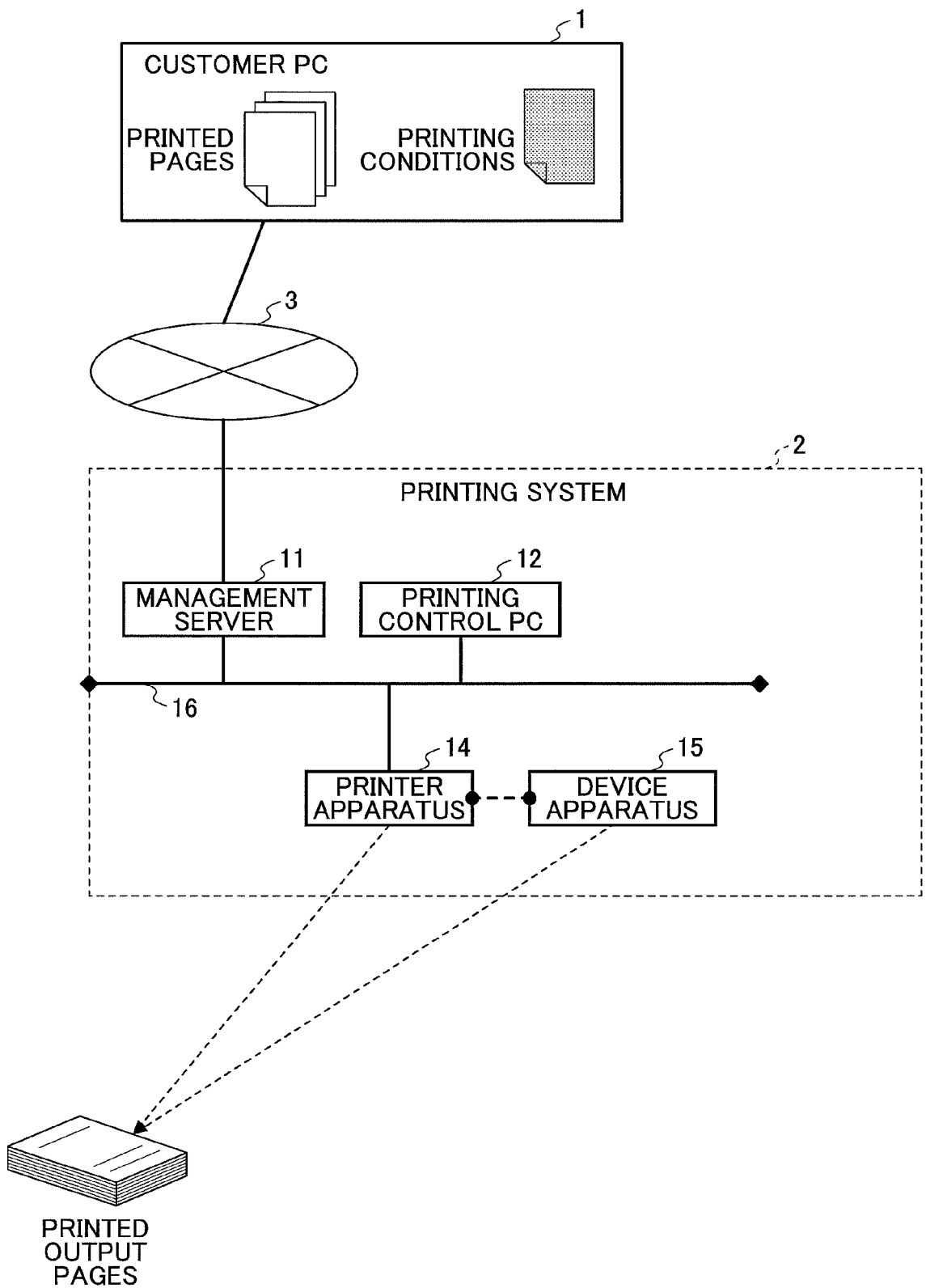
FIG. 1 is a system configuration diagram showing one example of a printing system according to an embodiment of the present invention.

FIG. 1 is a system configuration diagram showing one example of a printing system according to an embodiment of the present invention. In the system shown in FIG. 1, a customer PC 1 and a printing system 2 are connected using a network 3 such as the Internet. The customer PC 1 is an apparatus used by a customer. The printing system 2 is a system used by an operator of a commercial printer or the like.

Further, the printing system 2 includes a management server 11, a printing control PC 12, a printer apparatus 14, a device apparatus 15, and a network 16 such as a local area network (LAN). The management server 11, the printing control PC 12 and the printer apparatus 14 are connected using the network 16.

The management server 11 is an apparatus that manages data sent from the customer. The printing control PC 12 is an apparatus that carries out printing control. The printer apparatus 14 is an apparatus that prints printed output pages. The device apparatus 15 is an apparatus used in printing processing and post-process processing, and is connected to the printer apparatus 14.

The customer PC 1, the management server 11 and the printing control PC 12 may be any computer systems such as workstations, personal computers, servers or the like. The printer apparatus 14 may be any printer apparatus having a function of processing PDL.

The printer apparatus 14 may be a printer apparatus that is, for example, a desktop type printer or a floor type printer, and may be a printer apparatus that has a printing speed, on the order of 30 pages per minute or the like, usually used for domestic use or business use. Further, the printer apparatus 14 may be a printer apparatus suitable, as a production printer (for example, a continuous paper printer or a cut paper page printer), for use of printing more pages (for example, 100 pages per minute or more).

It is noted that the customer PC 1, the management server 11, the printing control PC 12, the printer apparatus 14 and the device apparatus 15 may be respective independent systems, or may be a system(s) in which all or some thereof are integrated. Further, the customer PC 1, the management server 11, the printing control PC 12, the printer apparatus 14 and the device apparatus 15 may use any communication medium and protocol for the purpose of sharing information thereamong.

The customer operates the customer PC 1, and transmits printing data of printed pages and printing conditions (job ticket), as data sent from the customer, to the management server 11 via the network 3. The job ticket includes JDF. The printing data is a target to be directly used for printing printed output pages. JDF defines a print job to be executed to carry out the printing.

The management server 11 manages the data sent from the customer received from the customer PC 1. The operator who carries out the generation of the printing output pages using the printing system 2 accesses the management server 11 from the printing control PC 12, and obtains the data sent from the customer. Based on the data sent from the customer, the printing control PC 12 carries out, in parallel, derivation of disassembled printing output data (described later) and transmission of the disassembled printing output data to the printer apparatus 14, for the purpose of obtaining the printed output pages from the printer apparatus 14. Thus, the printing control PC 12 carries out generation of the printed output pages through printing control of carrying out, in parallel, derivation of disassembled printing output data (described later) and transmission of the disassembled printing output data to the printer apparatus 14.

Thus, the printing control PC 12 transmits the disassembled printing output data to the printer apparatus 14 without waiting for the completion of derivation of all the disassembled printing output data. Therefore, it is possible to shorten FPOT.

Further, the printing control PC 12 obtains a status, device capabilities and so forth of the printer apparatus 14. The status of the printer apparatus 14 includes, for example, a state in which the printer apparatus 14 can carry out printing or a state in which the printer apparatus 14 cannot carry out printing, a state of the device apparatus 15 connected to the printer apparatus 14, and so forth. The device capabilities include, for example, paper settings for sheets of paper available at a time of printing, other capabilities available in the printer apparatus 14 and the device apparatus 15, and so forth.

<Hardware Configuration>

As examples of hardware configurations of the customer PC 1, the management server 11 and the printing control PC 12, an example of the printing control PC 12 realized by a personal computer (PC) will now be described. A hardware configurations of each of the customer PC 1 and the management server 11 may be the same as that of the printing control PC 12.

Figure 2:
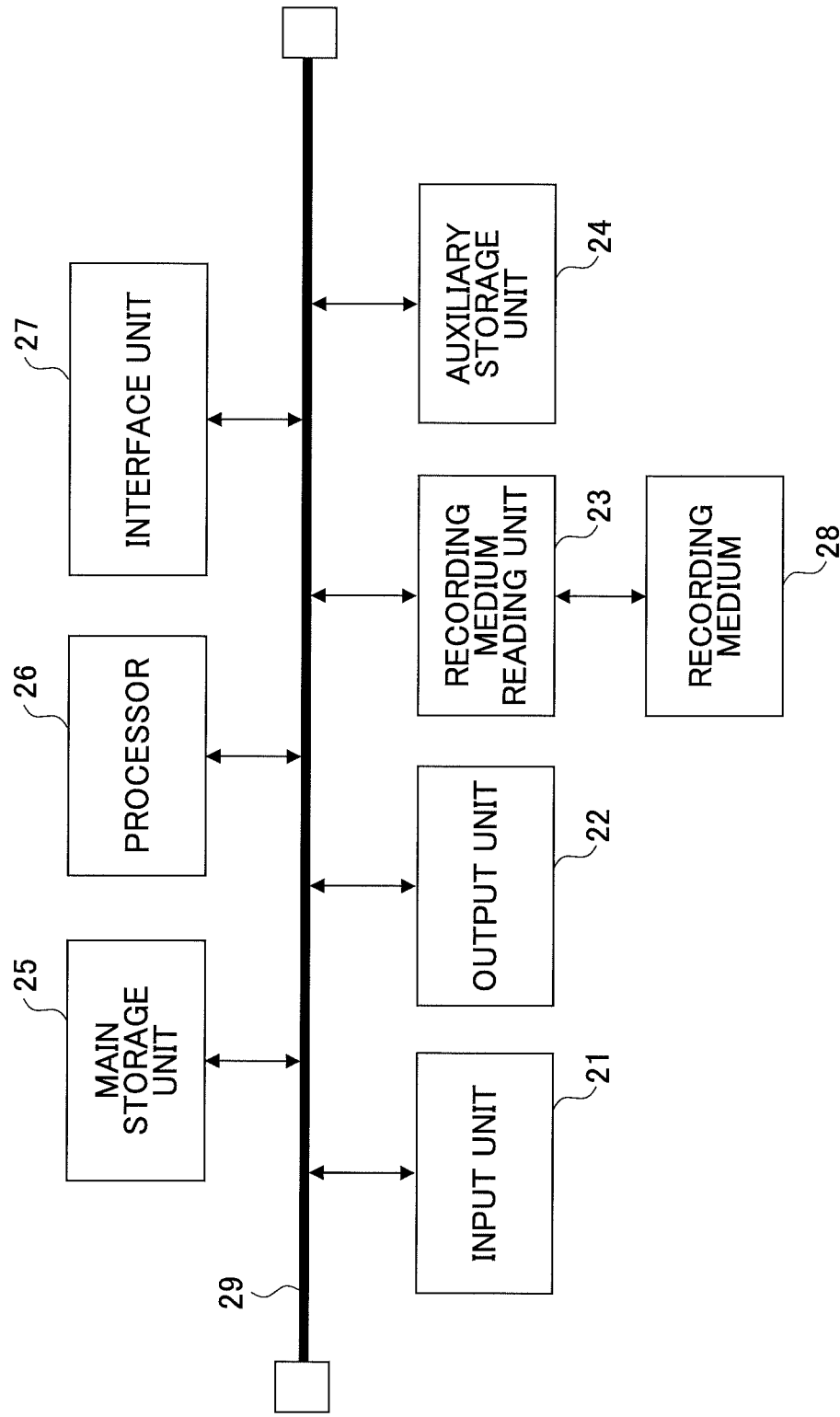
FIG. 2 is a hardware configuration diagram showing one example of a personal computer (PC)

The printing control PC 12 is realized by a PC 20 having a hardware configuration shown in FIG. 2, for example. FIG. 2 is a hardware configuration diagram showing one example of the PC 20. The PC 20 shown in FIG. 2 includes an input unit 21, an output unit 22, a recording medium reading unit 23, an auxiliary (secondary) storage unit 24, a main storage unit (memory) 25, a processor 26 and an interface unit 27, which are mutually connected using a bus 29.

The input unit 21 includes, for example, a keyboard, a mouse and so forth. The input unit 21 is used for inputting various signals. The output unit 22 includes, for example, a display unit or the like. The output unit 22 is used to display various windows (screen pages), various data, or the like. The interface unit 27 includes, for example, a modem, a LAN card, and so forth. The interface unit 27 is used for connecting with the network 16.

A printing control program(s) (which may be hereinafter simply referred to as a program) loaded in the printing control PC 12 is(are), at least, one or more of various programs that control the PC 20. The program is provided through, for example, delivery of a recording medium 28, downloading from the network 16, or the like.

As the recording medium 28, any one of various types of recording media such as recording media, storing information optically, electrically, or magnetically, such as a CD-ROM, a flexible disk, a magneto-optical disk and so forth, and semiconductor memories, storing information electrically, such as a ROM, a flash memory and so forth, can be used.

When the recording medium 28 storing the program is set in the recording medium reading unit 23, the program is installed in the auxiliary storage unit 24 via the recording medium reading unit 23. The program downloaded from the network 16 or the like is installed in the auxiliary storage unit 24 via the interface unit 27.

The auxiliary storage unit 24 stores the installed program, necessary files, data, and so forth. The main storage unit 25 reads the program from the auxiliary storage unit 24 and stores it, when starting up the program. Then, the processor 26 realizes various sorts of processing described later according to the program stored in the main storage unit 25.

<Software Configuration>

Figure 3:
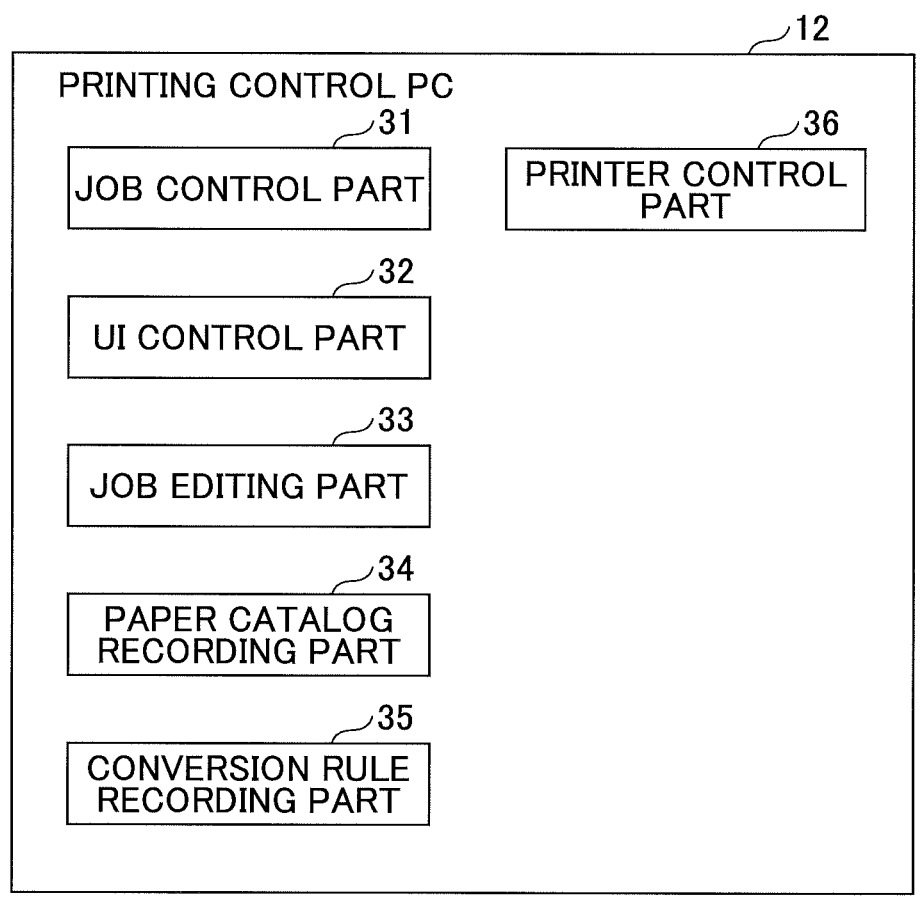
FIG. 3 is a processing block diagram showing one example of a printing control PC shown in FIG. 1.

In a case of the system shown in FIG. 1, the printing control PC 12 is realized by, for example, processing blocks shown in FIG. 3. FIG. 3 is a processing block diagram showing one example the printing control PC 12. The printing control PC 12 executes the program to realize a job control part 31, a user interface (UI) control part 32, a job editing part 33, a paper catalog recording part 34, a conversion rule recording part 35 and a printer control part 36.

The job control part 31 generates job data (the above-mentioned disassembled printing output data) obtained from converting the data sent from the customer into a data form in which the data sent from the customer can be used for printing carried out by the printer apparatus 14. The job control part 31 converts the data sent from the customer to the data form in which the data sent from the customer can be used for printing carried out by the printer apparatus 14, i.e., as one example, a PostScript (PS) form that is common. The UI control part 32 submits various screen pages to the operator, and receives printing settings from the operator.

The job editing part 33 carries out communications with the UI control part 32, and processes the printing settings received by the UI control part 32. The paper catalog recording part 34 records paper catalogs. The paper catalogs indicate paper settings using attributes of paper (paper attributes) used for printing, as information that does not depend on the printer apparatus 14. For example, each paper setting includes a paper type and a paper size (see FIG. 7). The conversion rule recording part 35 records conversion rules. The conversion rules are used for converting the paper settings indicated by the paper catalogs so that the paper settings can be expressed by paper attributes that can be used in the printer apparatus 14.

Further, the printer control part 36 obtains a status of the printer apparatus 14, and transmits the obtained status to the job control part 31. The printer control part 36 obtains the device capabilities of the printer apparatus 14, and transmits the obtained device capabilities to the job editing part 33. The printer control part 36 controls processing carried out by the printer apparatus 14 according to the job data (printing output data).

As one example, in a case where an imposition setting has been carried out as a printing setting from the UI control part 32, the job editing part 33 processes the imposition setting information. By processing the imposition setting information, the job editing part 33 creates JDF for carrying out printing by executing the job (print job) according to the imposition setting information. The job editing part 33 stores the imposition setting information in the created JDF.

Further, in a case where a post-process setting has been carried out as a printing setting from the UI control part 32, the job editing part 33 processes the post-process setting information. By processing the post-process setting information, the job editing part 33 creates JDF for carrying a post-process according to the post-process setting information. The job editing part 33 stores the post-process setting information in the created JDF.

Further, in a case where a structure setting has been carried out as a printing setting from the UI control part 32, the job editing part 33 processes the structure setting information. By processing the structure setting information, the job editing part 33 creates JDF for carrying out printing by executing the print job according to the structure setting information. The job editing part 33 stores the structure setting information in the created JDF.

Further, in a case where a paper setting has been carried out as a printing setting from the UI control part 32, the job editing part 33 processes the paper setting information. By processing the paper setting information, the job editing part 33 creates JDF for carrying out printing by carrying out the print job according to the paper setting information. The job editing part 33 stores the paper setting information in the created JDF.

Further, in a case where an exception setting has been carried out as a printing setting from the UI control part 32, the job editing part 33 processes the exception setting information. By processing the exception setting information, the job editing part 33 creates JDF for carrying out printing by executing the print job according to the exception setting information. The job editing part 33 stores the exception setting information in the created JDF.

<Paper Setting Using Paper Catalog>
<<Job Editing Part>>

Figure 4:
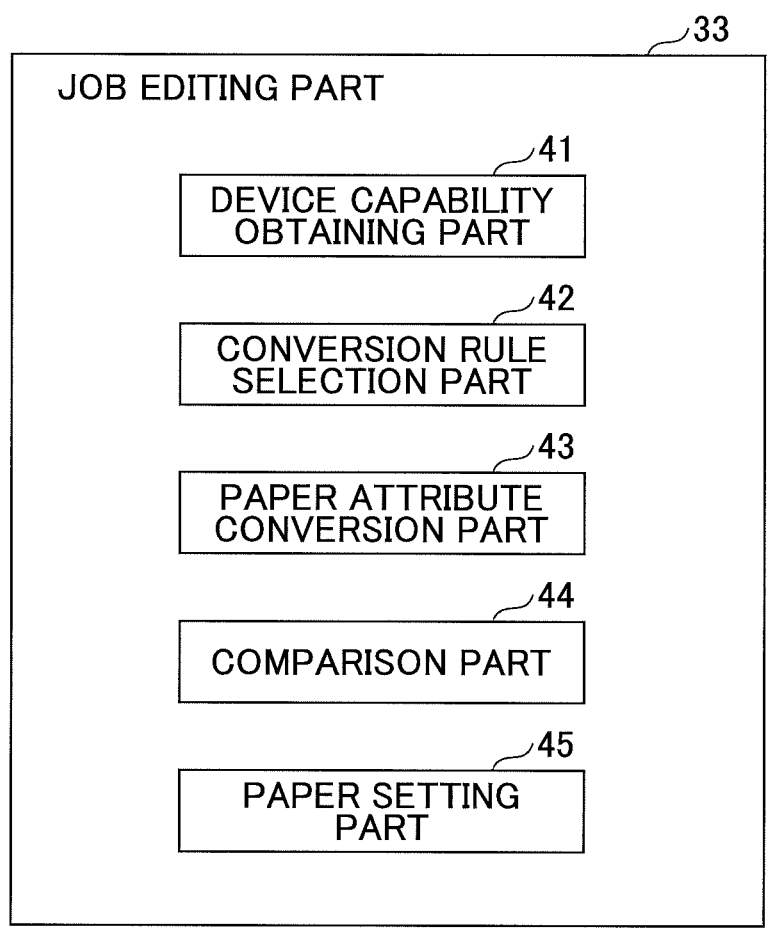
FIG. 4 is a processing block diagram showing one example of a job editing part shown in FIG. 3.

FIG. 4 is a processing block diagram showing one example the job editing part shown in FIG. 3. The job editing part 33 includes a device capability obtaining part 41, a conversion rule selection part 42, a paper attribute conversion part 43, a comparison part 44 and a paper setting part 45.

The device capability obtaining part 41 uses the printer control part 36, and obtains the device capabilities of the printer apparatus 14. The device capabilities include paper settings available in the printer apparatus 14. The conversion rule selection part 42 selects a conversion rule corresponding to the printer apparatus 14, from the conversion rule recording part 35. The paper attribute conversion part 43 uses the selected conversion rule, and converts the paper settings expressed by the paper catalogs, so that the paper settings can be expressed by paper attributes that can be used in the printer apparatus 14.

The comparison part 44 compares the paper settings converted by the paper attribute conversion part 43 and the paper settings available in the printer apparatus 14 obtained by the device capability obtaining part 41. The paper setting part 45 is allowed carry out a paper setting expressed by a paper catalog for which the comparison result is "coinciding".

<<Flow of Processing>>

Below, a flow of processing will be described for when, in the configuration of the processing blocks of the printing control PC 12 shown in FIG. 3 and FIG. 4, the operator operates the printing control PC 12 and causes the paper setting screen page to be displayed. The operator carries out a paper setting using the paper catalog.

Figure 5:
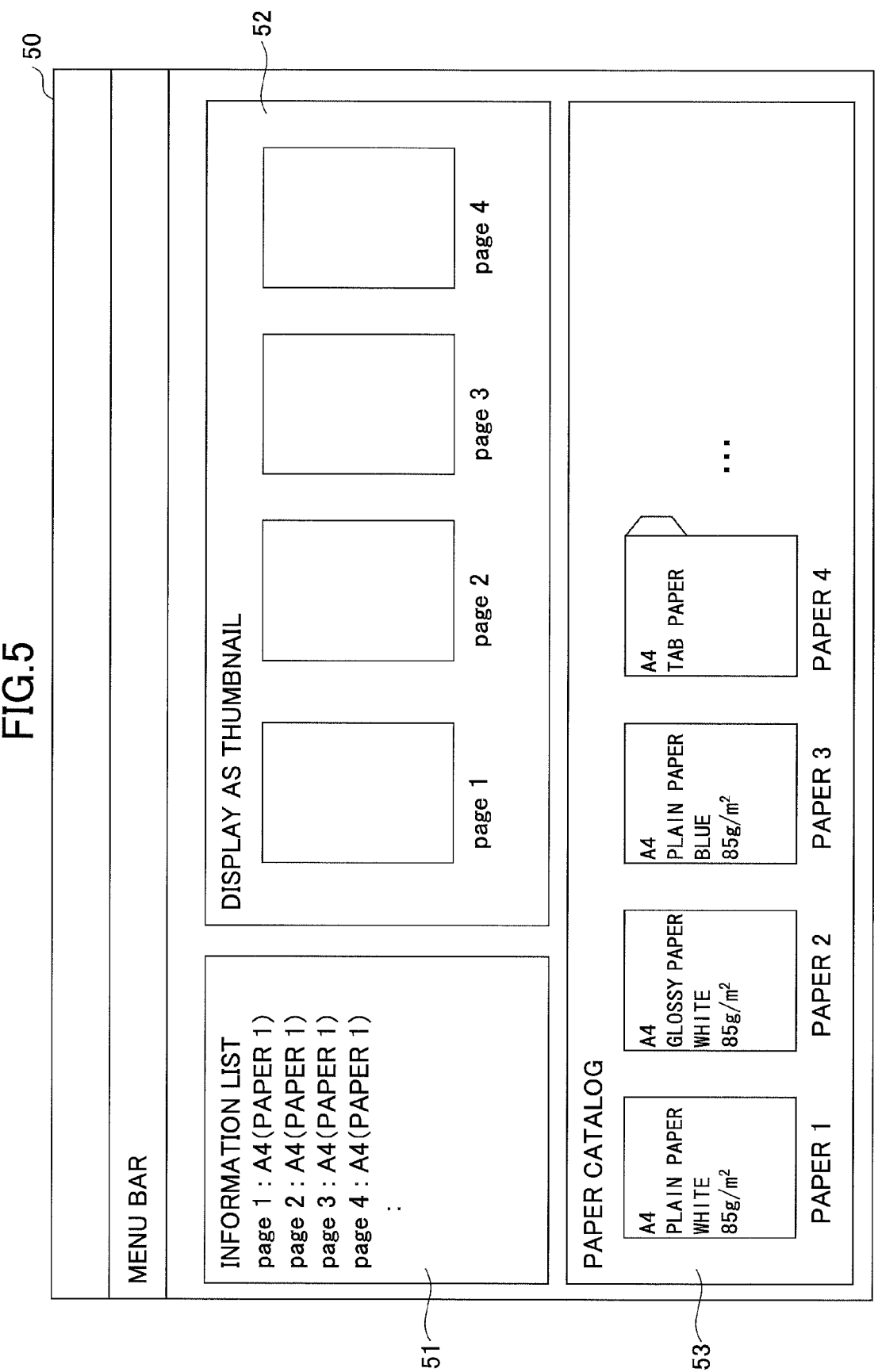
FIG. 5 shows an image of one example of a paper setting screen page.

The UI control part 32 submits the paper setting screen page such as that shown in FIG. 5, for example, to the operator, and the operator carries out a paper setting using a paper setting screen page 50. FIG. 5 shows an image of one example of the paper setting screen page 50. The paper setting screen page 50 of FIG. 5 is an example of a screen page that includes an information list display area 51, a thumbnail display area 52 and a paper catalog display area 53.

The information list display area 51 is an area displaying a list of information indicating the current paper settings for the respective pages of the printing data. The thumbnail display area 52 is an area displaying thumbnails of the respective pages of the printing data. The paper catalog display area 53 is an area displaying a list of paper catalogs by corresponding thumbnails.

For example, for a case of a use in the POD market, there are requests to easily change settings concerning paper (paper settings) such as "to use glossy paper only as a cover sheet", "to insert colored paper as a separator page" and so forth. The paper setting screen page 50 of FIG. 5 shows, as the paper catalogs, the paper settings which are usually used, as a result of previously registering such paper catalogs. Thereby, the operator can easily change settings concerning paper to be used for printing.

In the paper catalog display area 53 of the paper setting screen page 50 of FIG. 5, paper settings registered as the paper catalogs are displayed in the form of the list of icons. The operator can carry out a desired paper setting for a desired page, by carrying out "dragging and dropping operations", i.e., dragging the icon of the desired paper setting displayed in the paper catalog display area 53 of the paper setting screen page 50 and dropping it at the thumbnail of the desired page displayed in the thumbnail display area 52.

Figure 6:
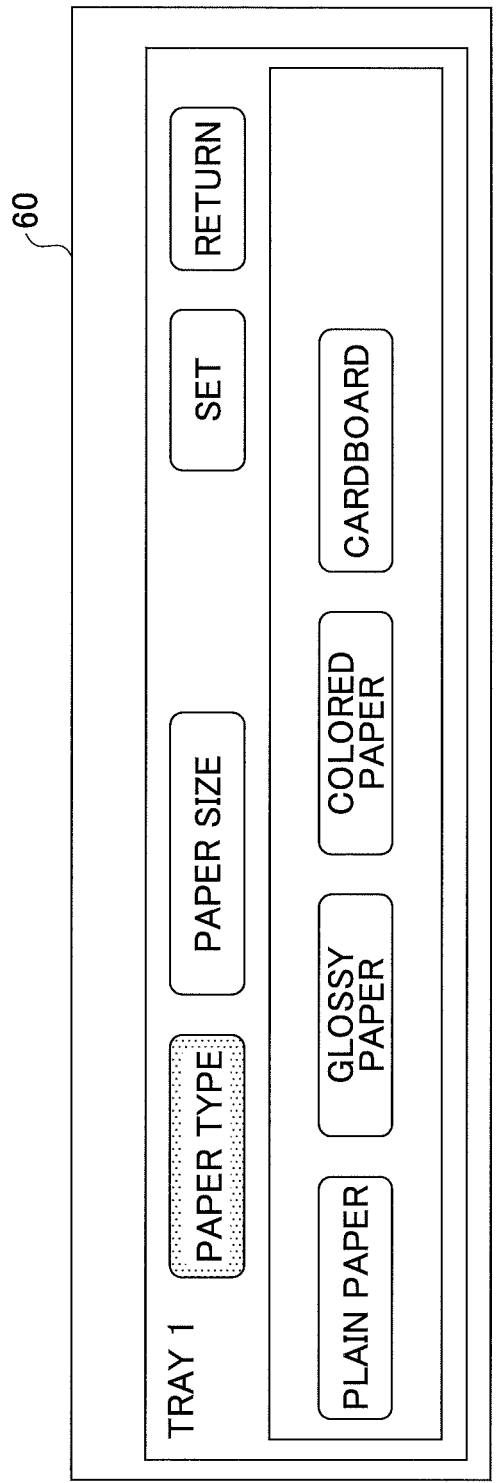
FIG. 6 shows an image of one example of a screen page for carrying out a paper setting, displayed on an operation panel of a printer apparatus.

FIG. 6 shows an image of one example of a screen page 60 for carrying out a paper setting, displayed on the operation panel of the printer apparatus 14. Generally speaking, a printer apparatus such as the printer apparatus 14 is configured to be able to report, to a printer driver or an application program, the current paper settings for the sheets of paper that have been set in the respective trays. The operator does not particularly need to manually set a paper attribute that can be automatically detected, such as a paper size. However, the operator needs to manually set, using the operation panel, paper attributes, for which it is difficult to provide corresponding sensors in the trays, such as a paper type, a paper thickness and so forth.

The screen page 60 of FIG. 6 is an example of a screen page for manually setting a paper type using the operation panel. After setting sheets of paper in a tray, the operator operates the operation panel, and sets the paper type of the sheets of paper that have been thus set in the tray, using the screen page 60. For example, by using the screen page 60, it is possible to select any one of plain paper, glossy paper, colored paper and cardboard, as the paper type.

Figure 7:
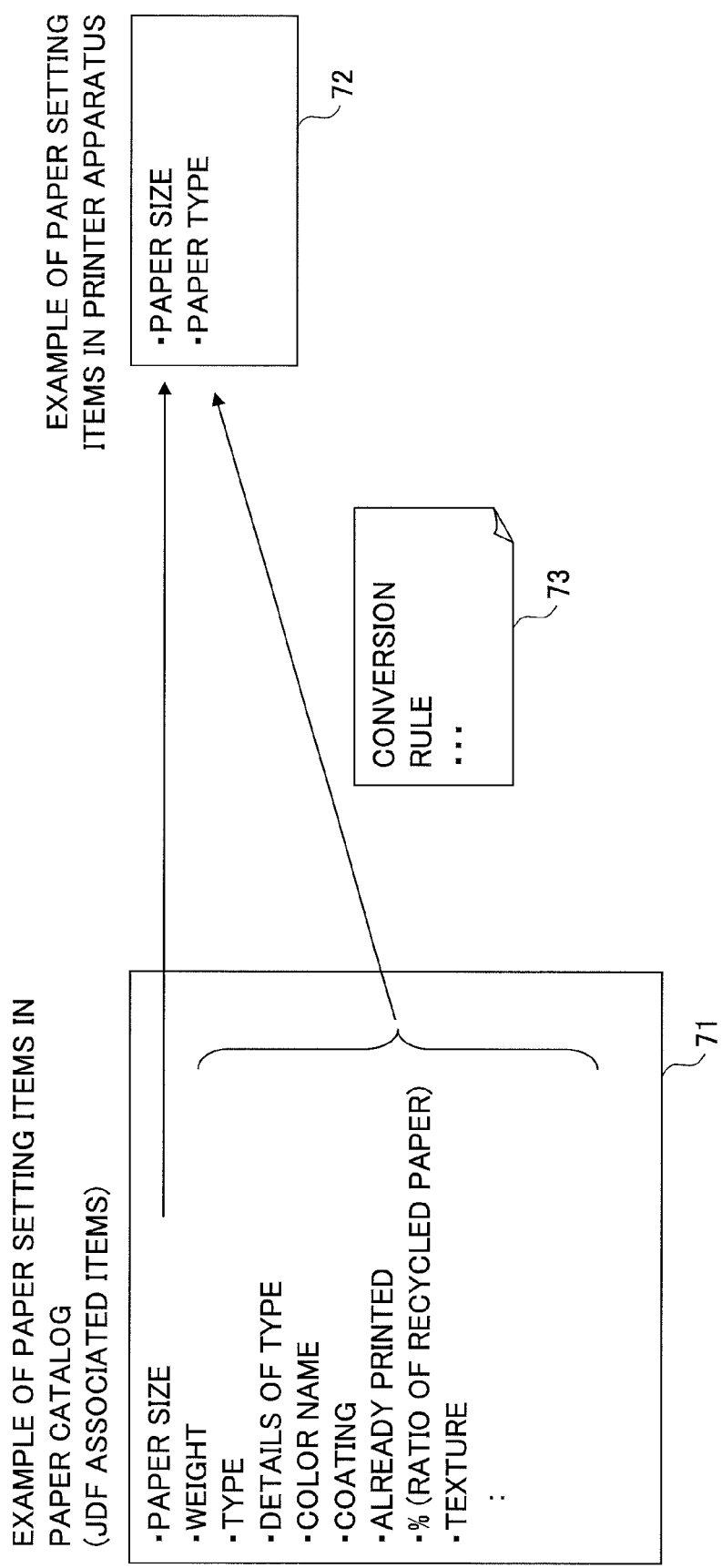
FIG. 7 illustrates one example of a difference between paper setting items in paper catalogs and paper setting items in the printer apparatus.

FIG. 7 illustrates one example of a difference between paper setting items in the paper catalogs and paper setting items in the printer apparatus 14. The paper setting items (paper attributes) 71 of the paper catalogs are easier for the operator to use, when they have information that does not depend on the printer apparatus 14, since it is not necessary to change the paper catalogs in response to a change of the printer apparatus 14. As a method of preparing the information that does not depend on the printer apparatus 14, a method has been coming into use in which by using JDF, definitions of settings concerning paper are described.

However, paper settings thus defined by JDF include general information not depending on the printer apparatus 14, as shown in FIG. 7, and therefore, the paper attributes 71 of the paper catalogs include various contents. The paper attributes 71 of the paper catalogs of FIG. 7 include, for example, a paper size, a weight, a type, details of type, a color name, coating, already printed, % (ratio of recycled paper), a texture, and so forth.

On the other hand, in many cases, the paper setting items (paper attributes) 72 in the printer apparatus 14 or the like include two or three items at the most, such as, for example, a paper size, a paper type and a paper thickness, or the like. The paper attributes 72 in the printer apparatus 14 of FIG. 7 show an example for a case where the paper attributes 72 in the printer apparatus 14 include two items, i.e., a paper size and a paper type.

The paper attributes 71 of the paper catalogs are converted into the paper attributes 72 of the printer apparatus 14 by the printer driver or the application program when, for example, printing is carried out. A conversion rule 73 used at this time is the conversion rule 73 that is the most suitable one defined for each particular one of printer apparatuses, such that the paper attributes 71 of the paper catalogs, to be used for printing using the paper registered as the paper catalog, can be converted into the paper attributes 72 of the printer apparatus 14.

FIGS. 8A and 8B illustrate one example of information of the device capabilities reported from the printer apparatus 14 to the printing control PC 12. FIG. 8A shows one example of the paper settings for sheets of paper that can be set for the respective trays. FIG. 8B shows one example of the paper settings for sheets of paper that have been currently set for the respective trays. The printer apparatus 14 reports the information concerning the device capabilities that are supported by the printer apparatus 14 to the printer driver or the application program of the printer control PC 12 using a protocol such as a simple network management protocol (SNMP), a management information base (MIB) or the like.

Generally speaking, for example, a UI of the printer driver or the like carries out control such that the operator can select any one of only the paper settings within the range of the device capabilities supported by the printer apparatus 14. As shown in FIGS. 8A and 8B, the information of the device capabilities reported from the printer apparatus 14 includes, for example, paper sizes and paper types as one example of the paper settings that can be set for the respective trays, and paper sizes and paper types as one example of the paper settings that have been currently set for the respective trays.

That is, the information of the device capabilities reported from the printer apparatus 14 is the same as the paper attributes 72 in the printer apparatus 14 shown in FIG. 7. For example, the UI of the printer driver may submit to the operator the information reported from the printer apparatus 14 for the operator to select therefrom. However, in a case of the paper setting screen page 50 such as that shown in FIG. 5, the information of the device capabilities reported from the printer apparatus 14 cannot be used as it is.

This is because as shown in FIG. 7, the relationship between the number M of the paper attributes 71 of the paper catalogs and the number N of the paper attributes 72 of the printer apparatus 14 is, in many cases, M:N (M>N). Therefore, the conversion from M to N is a non-reversible conversion. Therefore, even when receiving the information of the device capabilities such as that shown in FIG. 8A and 8B, the printing control PC 12 cannot convert the received information into the paper attributes 71 of the paper catalogs, and cannot carry out control such that the operator can select only the paper settings corresponding to the information of the device capabilities of the printer apparatus 14.

Figure 9:
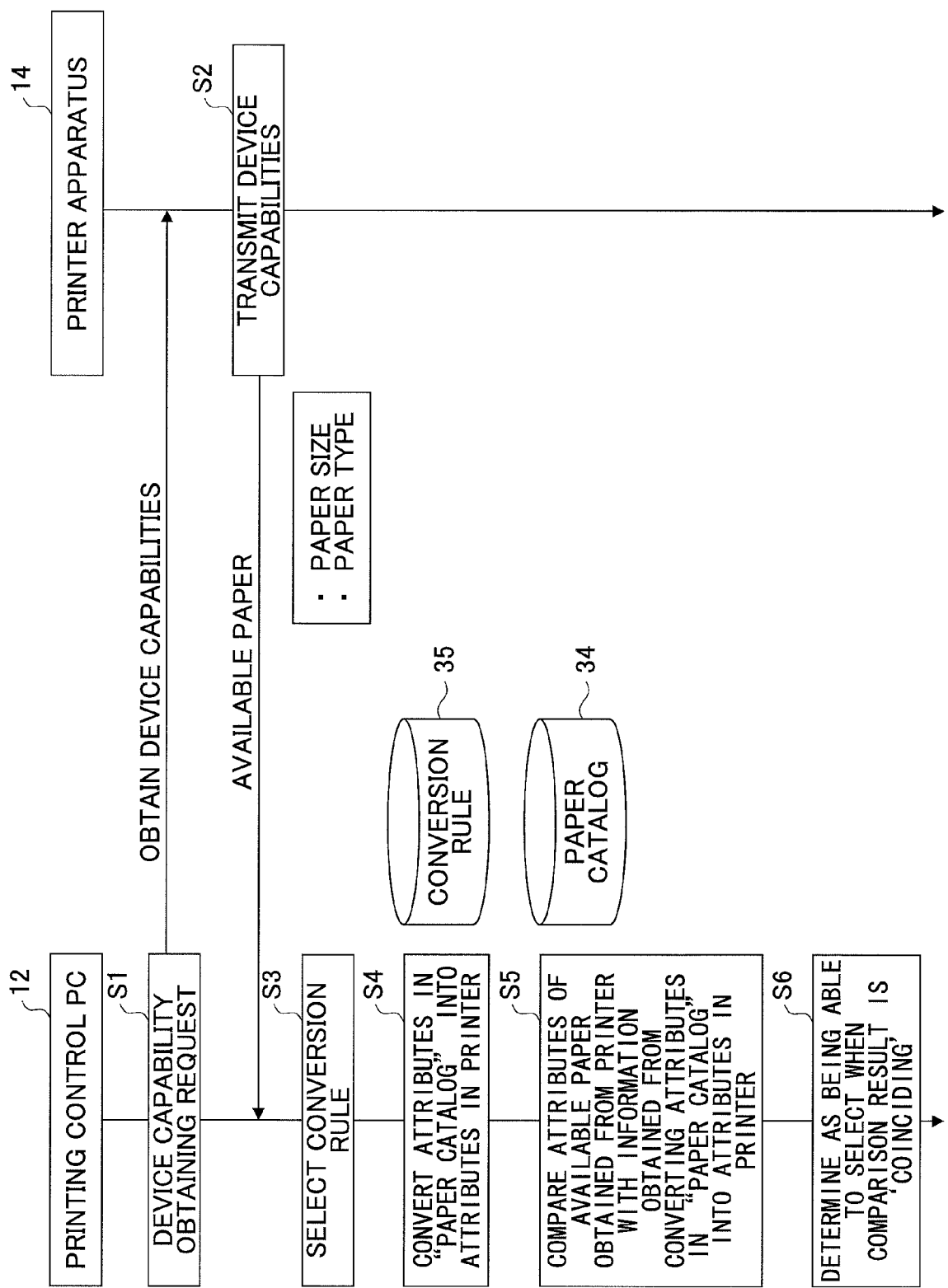
FIG. 9 is a sequence diagram of one example of processing to select a paper catalog that corresponds to the device capability of the printer apparatus.

Therefore, according to the embodiment of the present invention, the printing control PC 12 carries out control such that the operator can select only the paper settings corresponding to the information of the device capabilities of the printer apparatus 14, according to the procedure such as that shown in FIG. 9. FIG. 9 is a sequence diagram of one example of processing to select the paper catalogs that correspond to the device capabilities of the printer apparatus 14. The processing shown in FIG. 9 is carried out at a time when the paper setting screen page is displayed, a time when the paper setting is carried out using the paper catalog, a time when printing is carried out, or the like.

In step S1, the device capability obtaining part 41 of the job editing part 33 uses the printer control part 36, and sends a device capability obtaining request to the printer apparatus 14 of which printing is to be requested. It is assumed that the printer apparatus 14 does not support JDF.

In step S2, the printer apparatus 14 transmits the paper settings available at a time of printing to the device capability obtaining part 41 of the printing control PC 12 as the device capabilities together with capabilities that are available from an optional configuration or the like loaded in the printer apparatus 14.

In step S3, the conversion rule selection part 42 selects the conversion rule corresponding to the printer apparatus 14 from the conversion rule recording part 35. In step S4, the paper attribute conversion part 43 selects the paper settings indicated by the paper catalogs from the paper catalog recording part 34. The paper attribute conversion part 43 uses the conversion rule selected in step S3, and converts the paper settings of the paper catalogs so that the paper settings of the paper catalogs are expressed by the paper attributes that can be used in the printer apparatus 14.

In step S5, the comparison part 44 compares the paper settings of the paper catalogs that have been converted to be expressed as the paper attributes that can be used in the printer apparatus 14 and the paper settings available at a time of printing which have been received from the printer apparatus 14. Since the expressions of paper attributes of the paper settings of the paper catalogs that have been converted to be expressed as the paper attributes that can be used in the printer apparatus 14 with those of the paper settings available at a time of printing which have been received from the printer apparatus 14, the values (parameters) of the respective paper attributes can be compared.

It is noted that in a case where a paper setting received from the printer apparatus 14 does not include a paper attribute to be compared with a corresponding paper attribute of a paper catalog, the comparison part 44 ignores the paper attribute. On the other hand, in a case where a paper setting received from the printer apparatus 14 includes a paper attribute to be compared with a corresponding paper attribute of a paper catalog, but the paper attribute cannot be selected in some cases, the comparison part 44 does not ignore the paper attribute. For example, in a case where the paper attribute "color name" is not included in a paper setting received from the printer apparatus 14, the comparison part 44 ignores the paper attribute".

Further, in a case where a paper setting received from the printer apparatus 14 includes, for example, the paper attribute "color name", but "orange color", for example, cannot be selected in the printer apparatus 14 even if the operator has designated the parameter "orange color" for the paper attribute "color name", the comparison part 44 does not ignore the paper attribute "color name".

In step S6, the paper setting part 45 is allowed to carry out the paper setting indicated by the paper catalog for which the result of the comparison of the values (parameters) of the paper attributes by the comparison part 44 is "coinciding". It is noted that the contents of the processing of step S6 may be different depending as to which timing the processing shown in FIG. 9 is carried out, at a time when the paper setting screen page 50 is displayed, a time when the paper setting is carried out using the paper catalog or a time when printing is carried out.

For example, at the time of displaying the paper setting screen page 50, the paper setting part 45 can display the icons of the paper catalogs corresponding to the paper settings available in the printer apparatus 14, in the paper catalog display area 53 of the paper setting screen page 50 such as that shown in FIG. 5. At the time of carrying out printing, the paper setting part 45 sends printing instructions to the job control part 31 (with the paper setting available in the printer apparatus 14). Further, at a time of paper setting using the paper catalog, the paper setting of the icon (corresponding to the paper setting available in the printer apparatus 14), "dragged" from the paper catalog display area 53 of the paper setting screen page 50 such as that shown in FIG. 5 and "dropped" to the thumbnail display area 52, is carried out to the page of the printing data to which the icon has been "dragged and dropped".

FIGS. 10A and 10B show an image of one example of paper settings before and after the conversion in step S4 in FIG. 9. FIG. 10A shows one example of the paper setting of the paper catalog. The FIG. 10A shows the example in which the paper type included in the paper setting is set using nine paper attributes. FIG. 10B shows the paper setting of the paper catalog converted to be expressed by the paper attributes that can be used in the printer apparatus 14. FIG. 10B shows the example in which the paper type of the paper setting is set by a single paper attribute.

FIGS. 11A and 11B show an image of another example of paper settings before and after the conversion in step S4 in FIG. 9. In the paper setting of the paper catalog in FIG. 11A, the parameter ("0") of the paper attribute "% (ratio of recycled paper)" is different from FIG. 10A ("10"). As a result, the paper setting of the paper catalog converted to be expressed by the paper attribute that can be used in the printer apparatus 14 in FIG. 11B ("already printed") is different from the parameter ("recycled paper") of the paper attribute "paper type" of FIG. 10B.

In a case of selecting paper from the paper catalogs in which the paper settings are carried out in the form of JDF, and carrying out the paper setting in the printer apparatus 14 that does not support JDF, the printing control PC 12 converts the paper settings of the paper catalogs to be expressed by the paper attributes that can be used in the printer apparatus 14 and compares the converted paper settings with the paper settings available in the printer apparatus 14. Thereby, the operator can determine the paper catalogs of the paper settings that can be used in the printer apparatus 14 of which printing is to be requested.

Thus, the operator of the printing control PC 12 can easily determine paper that can be used in the printer apparatus 14 from the paper catalogs displayed in the paper catalog display area 53 of the paper setting screen page 50 even when the printer apparatus 14 of which printing is to be requested, does not support JDF.

<Processing of Converting JDF to PDL>
<<Job Control Part>>

Figure 12:
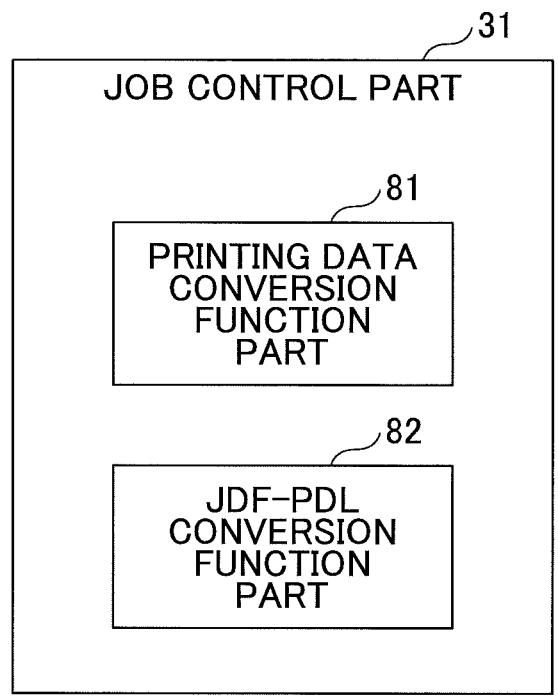
FIG. 12 is a processing block diagram of one example of a job control part shown in FIG. 3.

FIG. 12 is a processing block diagram of one example of the job control part 31 shown in FIG. 3. The processing block diagram of FIG. 12 shows a part of the job control part 31 concerning the process of converting JDF to PDL. The job control part 31 includes a printing data conversion function part 81 and a JDF-PDL conversion function part 82. The printing data conversion function part 81 and the JDF-PDL conversion function part 82 of FIG. 12 may be respective independent functions, or a function(s) in which all or some thereof are integrated.

The printing data conversion function part 81 derives PDL converted from the printing data included in the data sent from the customer, based on the printing data included in the data sent from the customer. The JDF-PDL conversion function part 82 derives command language strings (described later) as disassembled printing output data based on the JDF and the PDL that has been converted from the printing data by the printing data conversion function part 81. It is noted that details of the processing of the printing data conversion function part 81 and the JDF-PDL conversion function part 82 will be described later.

<<Printer Control Part>>

Figure 13:
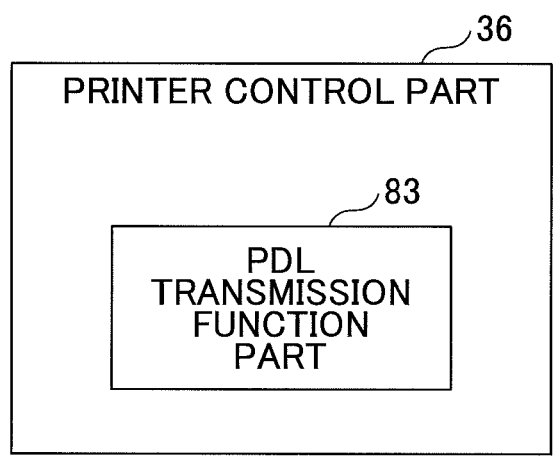
FIG. 13 is a processing block diagram of one example of a printer control part shown in FIG. 3.

FIG. 13 is a processing block diagram of one example of the printer control part 36 shown in FIG. 3. The processing block diagram of FIG. 13 shows a part of the printer control part 36 concerning the process of converting JDF to PDL. The printer control part 36 includes a PDL transmission function part 83. The PDL transmission function part 83 transmits the command language strings (disassembled printing output data) derived from the JDF-PDL conversion function part 82 to the printer apparatus 14. Details of the PDL transmission function part 83 will be described later.

<<Processing of Printing Data Conversion Function Part>>

Figure 14:
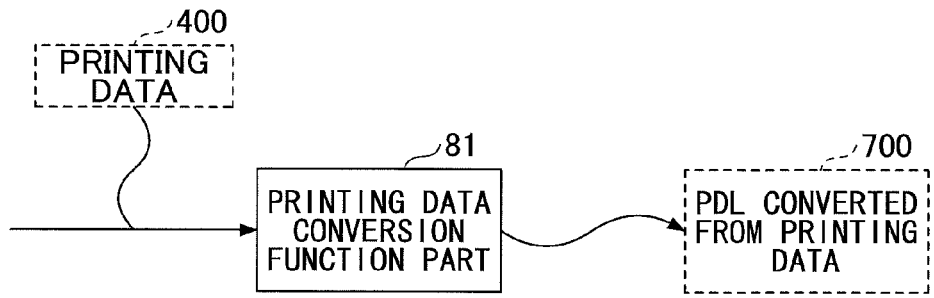
FIG. 14 illustrates one example of processing of a printing data conversion function part shown in FIG. 12.

FIG. 14 illustrates one example of processing of the printing data conversion function part 81 shown in FIG. 12. The printing data conversion function part 81 derives the PDL 700 converted from the printing data based on the printing data 400 included in the data sent from the customer. It is noted that hereinafter, the PDL 700 converted from the printing data will be simply referred to as PDL 700.

It is noted that the printing data 400 may be, for example, data of any data form that can be processed as the printing data such as portable document format (PDF). It is noted that the printing parameters of JDF included in the data sent from the customer are not reflected in the PDL 700.

Figure 15:
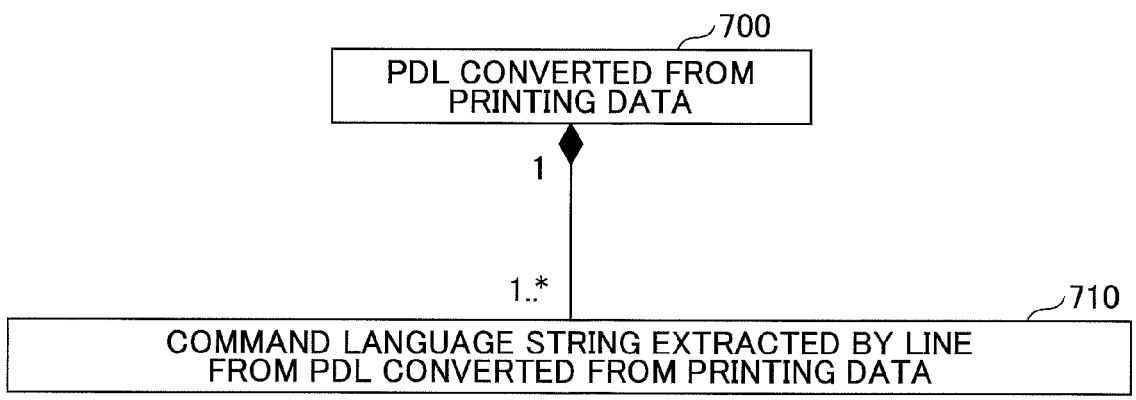
FIG. 15 is a class diagram of one example of PDL converted from printing data.

FIG. 15 is a class diagram of one example of PDL 700. PDL 700 includes one or more command language strings 710 extracted, by line, from PDL converted from the printing data. Hereinafter, the command language strings 710 extracted, by line, from PDL converted from the printing data will be simply referred to as command language strings 710.

<<Processing of JDF-PDL Conversion Function Part and PDL Transmission Function Part>>

Figure 16:
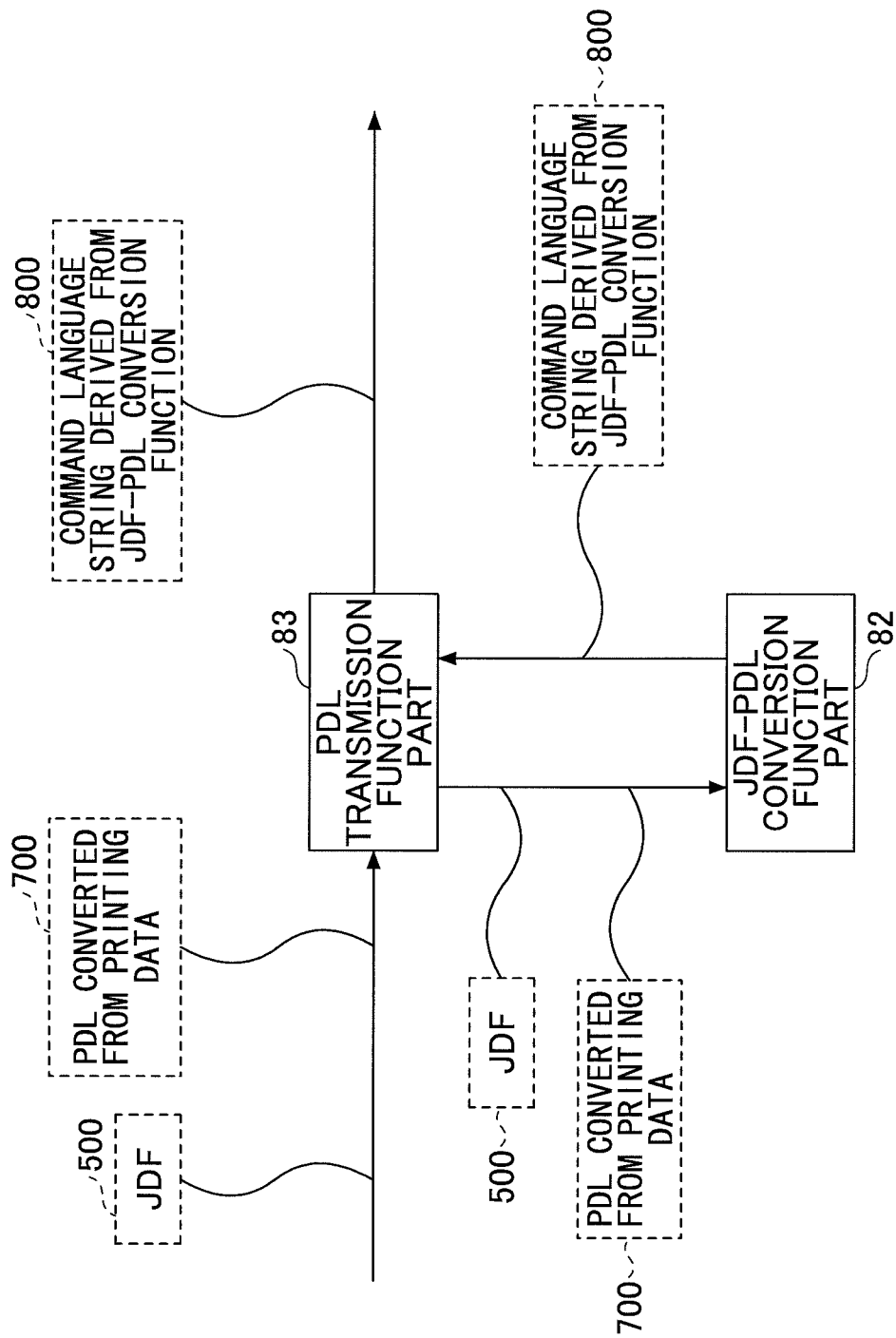
FIG. 16 illustrates one example of processing of a JDF-PDL conversion function part and a PDL transmission function part shown in FIGS. 12 and 13, respectively.

FIG. 16 illustrates one example of processing of the JDF-PDL conversion function part 82 and the PDL transmission function part 83 shown in FIGS. 12 and 13, respectively. The PDL transmission function part 83 gives JDF 500 included in the data sent from the customer and PDL 700 derived from the printing data conversion function part 81 to the JDF-PDL conversion function part 82.

The JDF-PDL conversion function part 82 derives, from the given JDF 500 and PDL 700, command language strings

800, derived from the JDF-PDL conversion function, as will be described later. Hereinafter, the command language strings 800 derived from the JDF-PDL conversion function will be simply referred to as command language strings 800. The PDL transmission function part 83 transmits the command language strings 800 derived from the JDF-PDL conversion function part 82 to the printer apparatus 14.

Thus, the PDL transmission function part 83 carries out, repetitively, a sequence of processing of giving JDF 500 and PDL 700 to the JDF-PDL conversion function part 82, and transmitting the command language strings 800 derived from the JDF-PDL conversion function part 82 to the printer apparatus 14.

Figure 17:
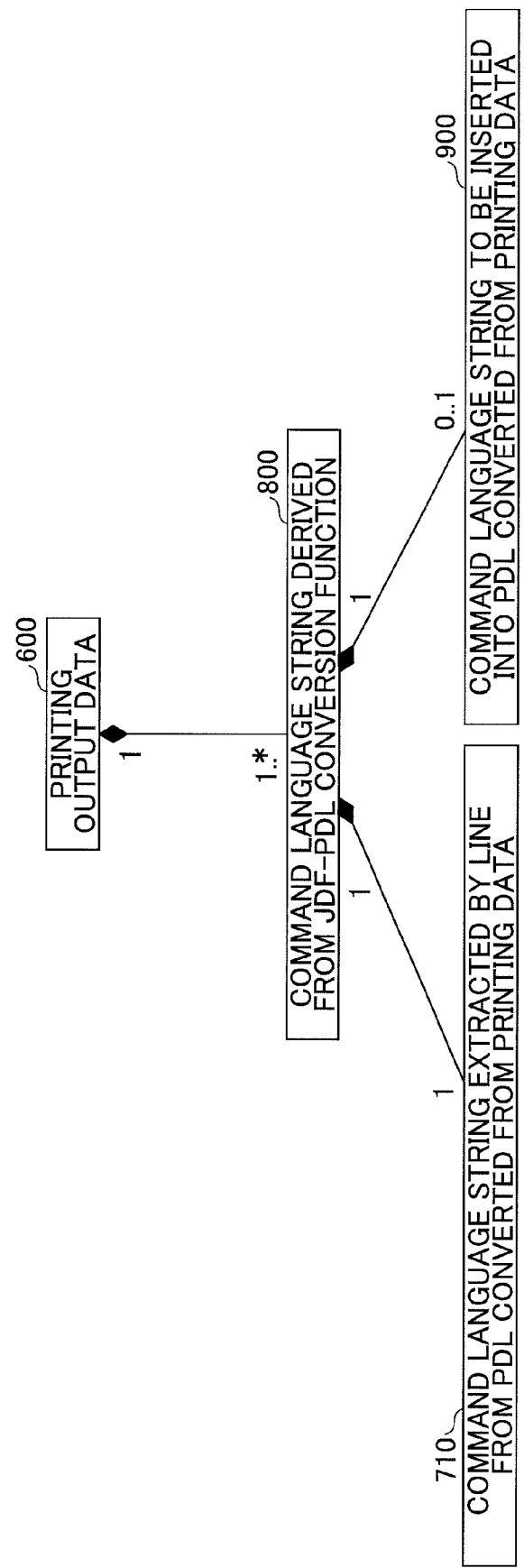
FIG. 17 is a class diagram of one example of printing output data.

FIG. 17 is a class diagram of one example of the printing output data. The printing output data 600 to be transmitted to the printer apparatus 14 includes one or more command language strings 800. Each of the command language strings 800 has a configuration for including one command language string 710 or a configuration for merging one command language string 710 with one or more command language strings 900 to be inserted into PDL converted from the printing data 400. Hereinafter, the command language strings 900, to be inserted into PDL converted from the printing data 400, will be simply referred to as command language strings 900.

Figure 18:
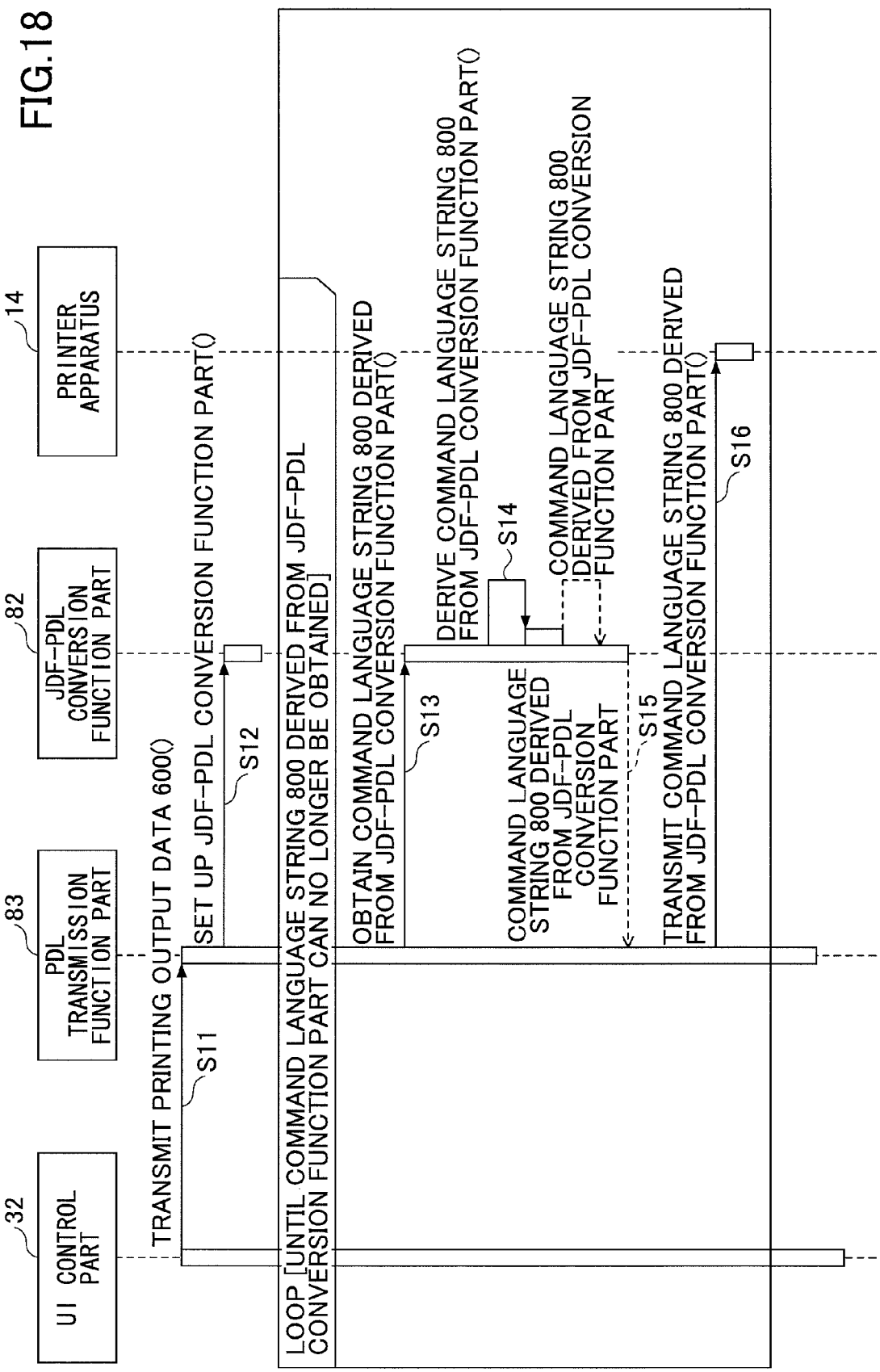
FIG. 18 is a sequence diagram of one example of processing of the JDF-PDL conversion function part and the PDL transmission function part.

FIG. 18 is a sequence diagram of one example of processing of the JDF-PDL conversion function part 82 and the PDL transmission function part 83. For example, when receiving a printing execution request from the operator, the UI control part 32 requests the PDL transmission function part 83 to transmit the printing output data 600 in step S11. The part which requests the PDL transmission function part 83 to transmit the printing output data may be the printer driver or the application program. In step S12, the PDL transmission function part 83 sets up the JDF-PDL conversion function part 82.

The PDL transmission function part 83 repeats steps S13 through S16 until the command language strings 800 can no longer be obtained. In step S13, the PDL transmission function part 83 requests the JDF-PDL conversion function part 82 to obtain the command language string 800.

In step S14, the JDF-PDL conversion function part 82 derives the command language string 800. In step S15, the JDF-PDL conversion function part 82 returns the command language string 800 to the PDL transmission function part 83. In step S16, the PDL transmission function part 83 transmits the command language spring 800 to the printer apparatus 14.

As shown in FIG. 17, one or more command language strings 800 are included in the printing output data 600. In other words, the command language strings 800 are disassembled printing output data. Therefore, when the printing control PC 12 has derived the disassembled printing output data, the printing control PC 12 transmits the derived command language string 800 to the printer apparatus 14 without waiting for the completion of derivation of all the command language strings 800. Therefore, FPOT can be shortened.

<<JDF-PDL Conversion Function Part>>

Figure 19:
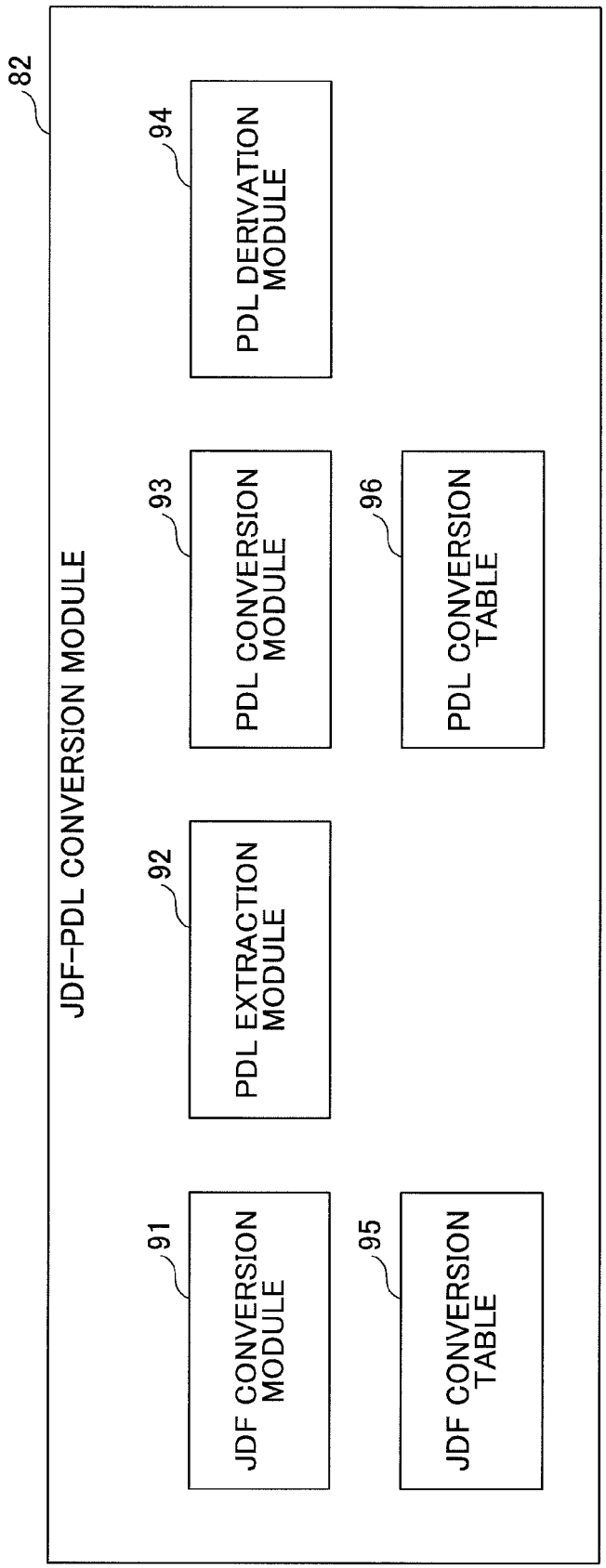
FIG. 19 is a processing block diagram of one example of the JDF-PDL conversion function part.

FIG. 19 is a processing block diagram of one example of the JDF-PDL conversion function part 82. The JDF-PDL conversion function part 82 includes a JDF conversion module 91, a PDL extraction module 92, a PDL conversion module 93, a PDL derivation module 94, a JDF conversion table 95 and a PDL conversion table 96. The JDF conversion module 91, the PDL extraction module 92, the PDL conversion module 93, the PDL derivation module 94, the JDF conversion table 95 and the PDL conversion table 96 of FIG. 19 may be respective independent modules, or a module(s) in which all or some thereof are integrated.

The JDF conversion module 91 derives JDF converted data (described later) using the JDF conversion table 95 based on JDF 500. The PDL extraction module 92 derives the command language strings 710 based on PDL 700. The PDL conversion module 93 derives the command language strings 900 using the PDL conversion table 96 based on the command language strings 710 and the JDF converted data.

The PDL derivation module 94 derives the command language strings 800 based on the command language strings 710 and 900. It is noted that the JDF conversion table 95 and the PDL conversion table 96 will be described later. The JDF conversion table 95 and the PDL conversion table 96 may be provided in a place other than the JDF-PDL conversion function part 82.

<<Processing of JDF Conversion Module>>

Figure 20:
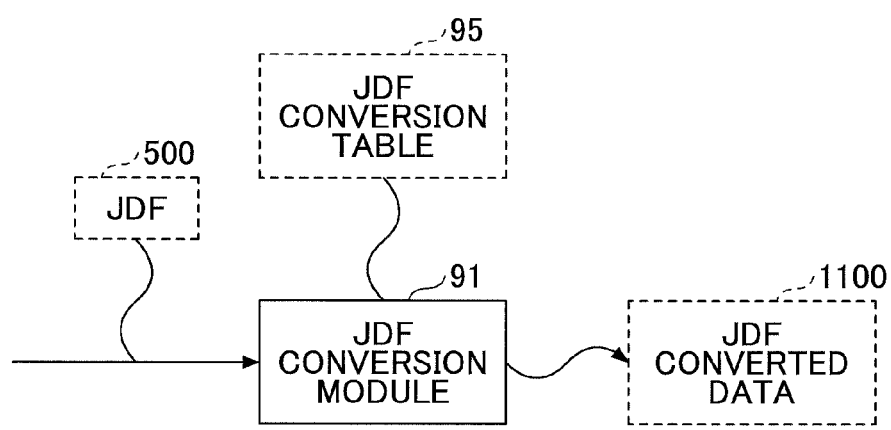
FIG. 20 illustrates one example of processing of a JDF conversion module shown in FIG. 19.

FIG. 20 illustrates one example of processing of the JDF conversion module 91 shown in FIG. 19. The JDF conversion module 91 derives the JDF converted data 1100 using the JDF conversion table 95 such as that shown in FIG. 21 based on JDF 500.

Figure 21:
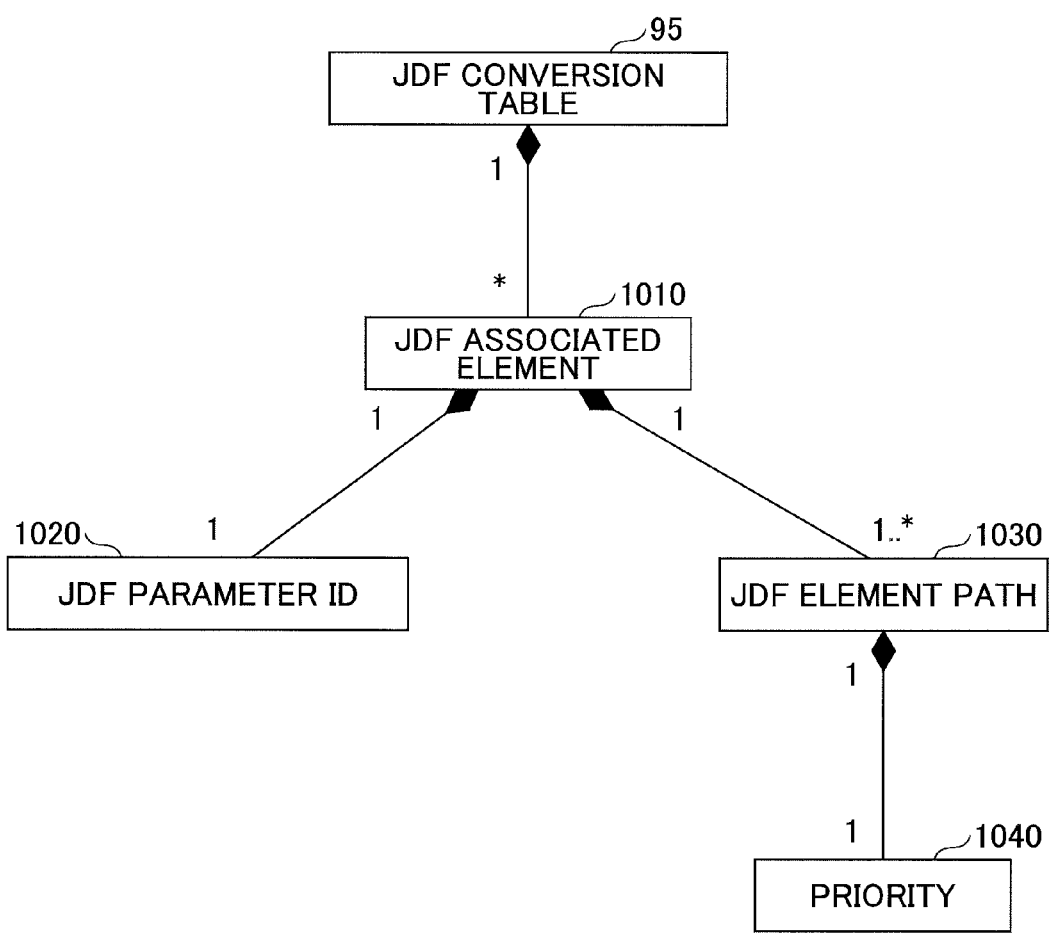
FIG. 21 is a class diagram of one example of a JDF conversion table shown in FIG. 19.

FIG. 21 is a class diagram of one example of the JDF conversion table 95 shown in FIG. 19. The JDF conversion table 95 includes one or more JDF associated elements 1010. Each of the JDF associated element 1010 includes one JDF parameter ID 1020 and one or more JDF element paths 1030. Each of the JDF element paths 1030 includes one priority 1040.

The JDF element paths 1030 are paths indicating positions according to a hierarchical structure prescribed in the JDF standard for identifying the respective JDF elements of JDF 500. In JDF 500, there is a case where the JDF elements indicating the same or similar printing parameters are designated at plural positions in the hierarchical structure. The JDF parameter ID 1020 is an ID indicating the same or similar printing parameters.

The priority 1040 is used to set a priority in each of the JDF element paths for obtaining the JDF elements in a case where the JDF elements corresponding to the same or similar printing parameter(s) exist at plural positions in the hierarchical structure. The purpose of the JDF conversion table 95 is to provide a high-speed index for necessary JDF elements from among a large quantity of JDF elements, in order to derive the JDF converted data 1100.

Figure 22:
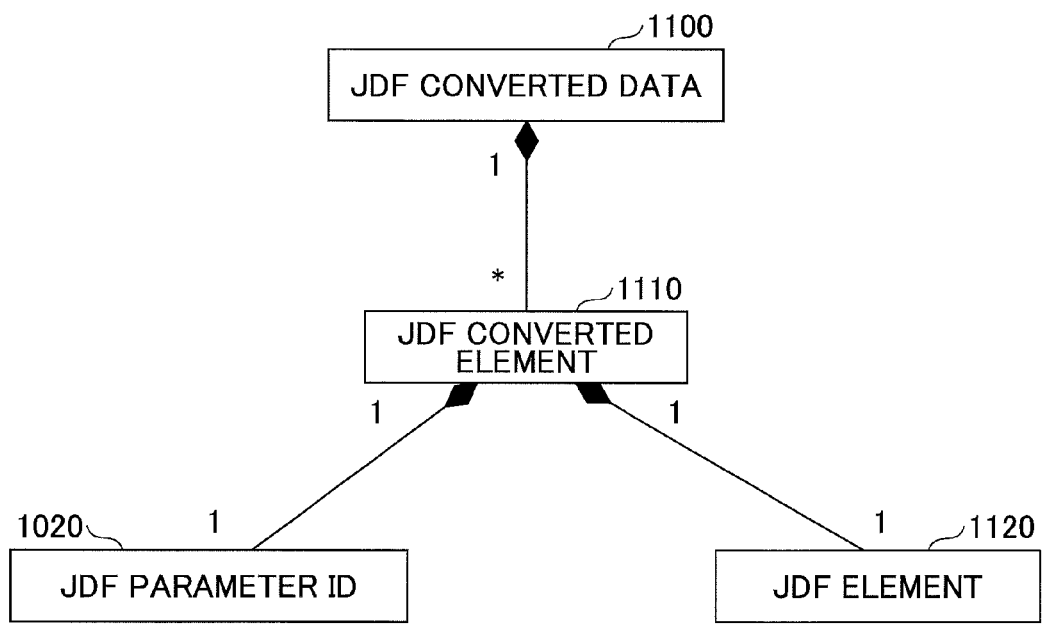
FIG. 22 is a class diagram of one example of JDF converted data shown in FIG. 20.

FIG. 22 is a class diagram of one example of the JDF converted data 1100. The JDF converted data 1100 includes one or more JDF converted elements 1110. Each of the JDF converted elements 1110 includes one JDF parameter ID 1020 and one JDF element 1120. The purpose of the JDF converted data 1100 is to provide a data form such that JDF 500 can be used in a linear structure without aware of the hierarchical structure by giving priority to the JDF elements in one area of the hierarchical structure even in a case where the JDF elements indicated by the printing parameters are designated at plural positions in the hierarchical structure.

<<Processing of PDL Extraction Module>>

Figure 23:
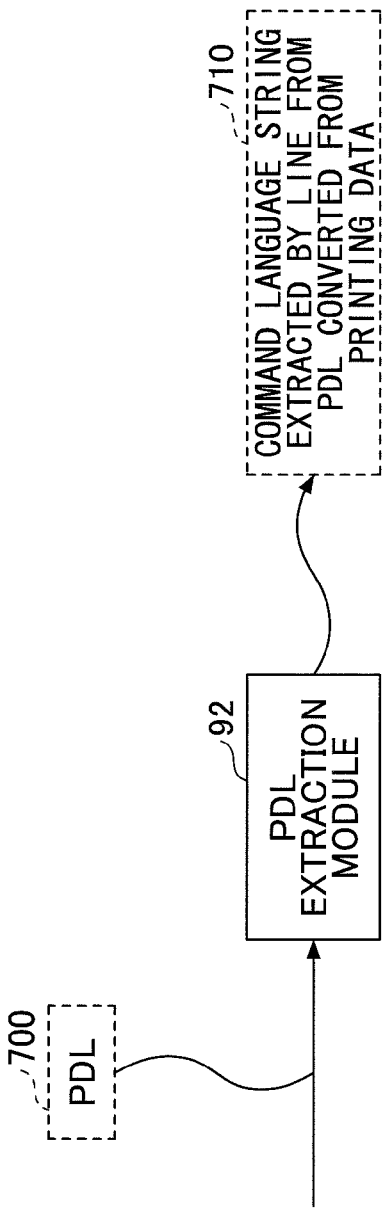
FIG. 23 illustrates one example of processing of a PDL extraction module shown in FIG. 19.

FIG. 23 illustrates one example of processing of the PDL extraction module 92 shown in FIG. 19. The PDL extraction module 92 derives the command language strings 710 based on PDL 700.

<<Processing of PDL Conversion Module>>

Figure 24:
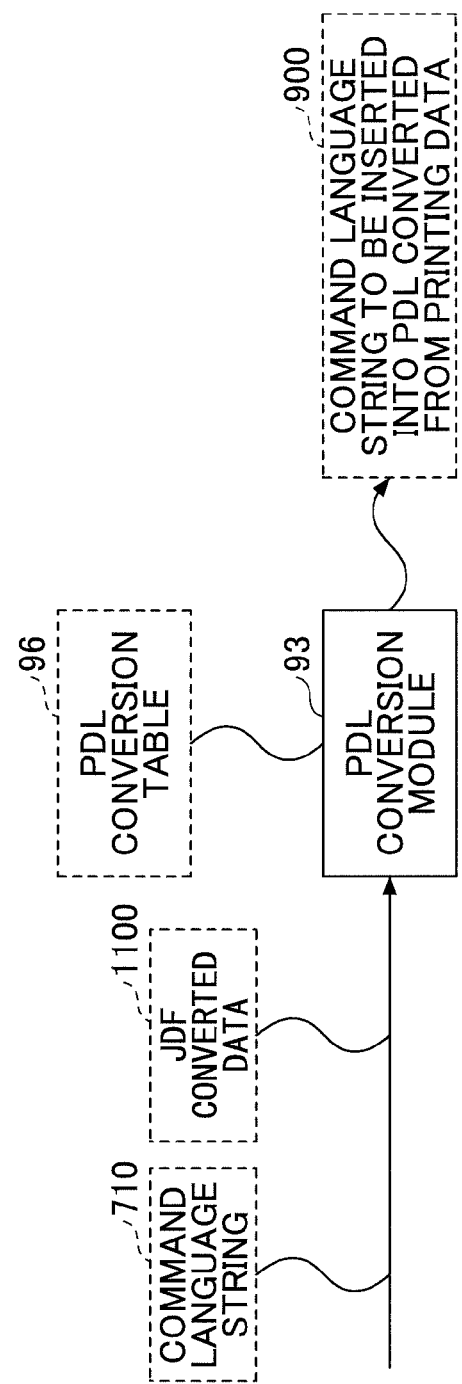
FIG. 24 illustrates one example of processing of a PDL conversion module shown in FIG. 19.

FIG. 24 illustrates one example of processing of the PDL conversion module 93 shown in FIG. 19. The PDL conversion module 93 derives the command language strings 900 using the PDL conversion table 96 shown in FIG. 25 based on the command language strings 710 and the JDF converted data 1100.

Figure 25:
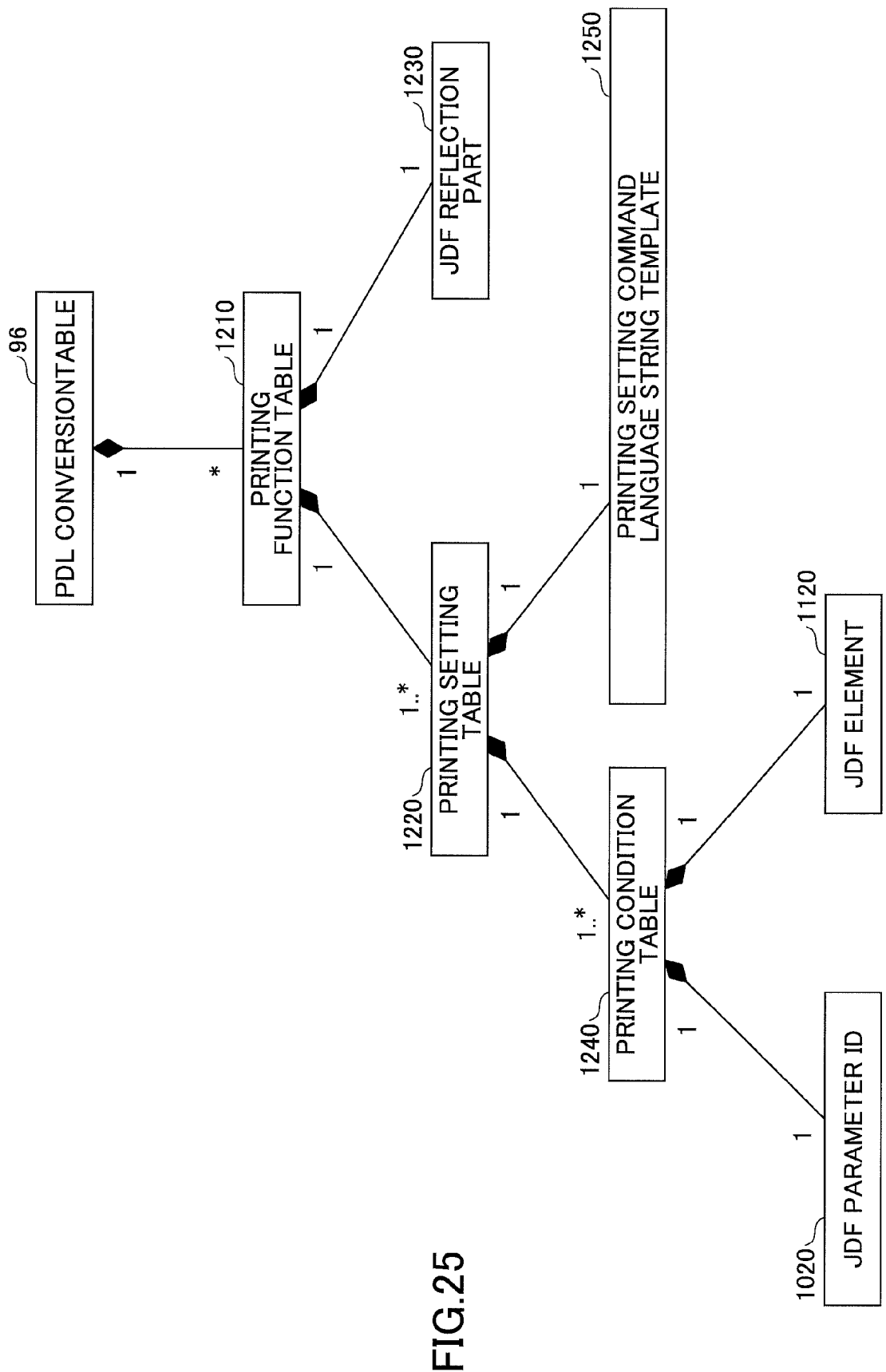
FIG. 25 is a class diagram of one example of a PDL conversion table shown in FIG. 19.

FIG. 25 is a class diagram of one example of the PDL conversion table 96 shown in FIG. 19. The PDL conversion table 96 includes one or more printing function tables 1210. Each of the printing function tables 1210 includes one or more printing setting tables 1220 and one JDF reflection part 1230. Each of the printing setting tables 1220 includes one or more printing condition tables 1240 and one printing setting command language string template (template for a printing setting command language string) 1250. Further, each of the printing condition tables 1240 includes one JDF parameter ID 1020 and one JDF element 1120.

It is noted that the printing setting command language string template 1250 may be a corresponding printing setting command language string (i.e., a printing setting command language string 1300 described later). The printing setting command language string template 1250 is a template to be used to derive a command language string that is variable depending on the printing parameter such as, for example, the number of copies.

Figure 26:
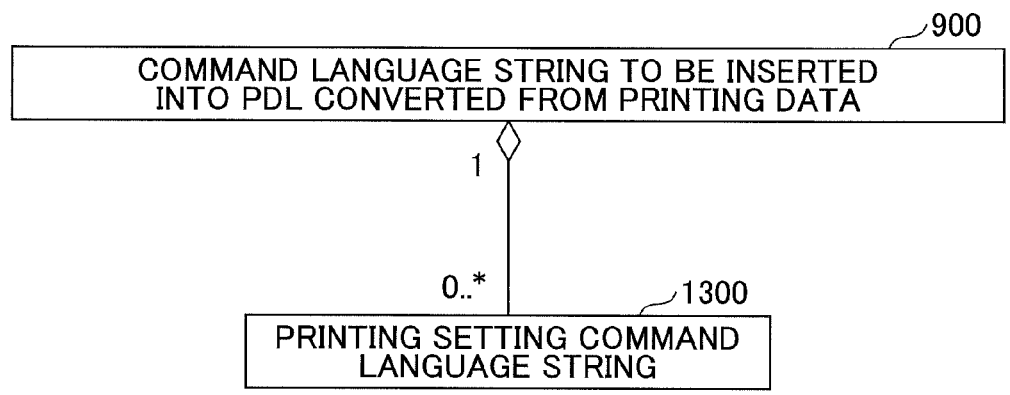
FIG. 26 is a class diagram of one example of a command language string.

FIG. 26 is a class diagram of one example of the command language string 900. The command language string 900 includes one or more printing setting command language strings 1300.

<<Processing of PDL Derivation Module>>

Figure 27:
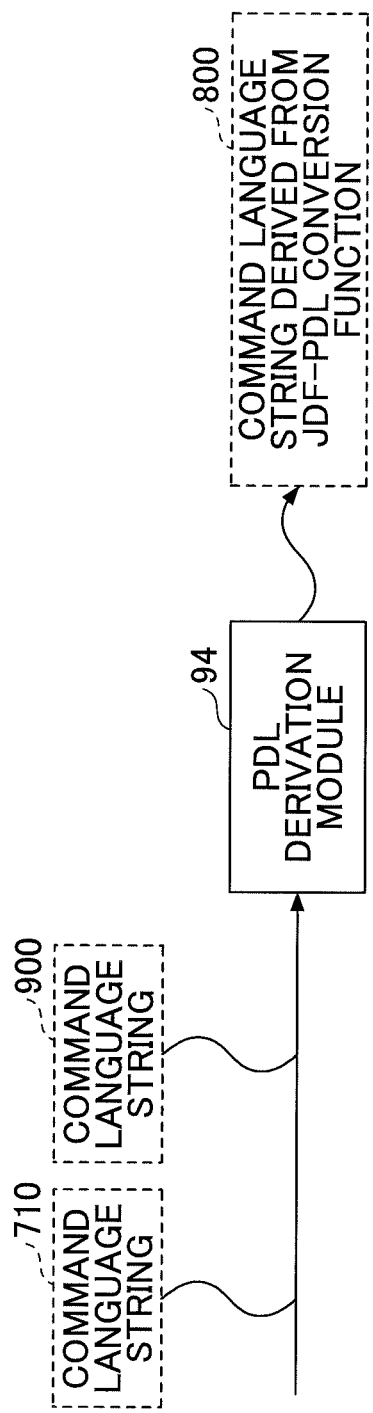
FIG. 27 illustrates one example of processing of a PDL derivation module shown in FIG. 19.

FIG. 27 illustrates one example of processing of the PDL derivation module 94 shown in FIG. 19. The PDL derivation module 94 derives the command language strings 800 based on the command language strings 710 and 900.

<<Details of Processing of JDF-PDL Conversion Function Part and PDL Transmission Function Part>>

FIG. 28 is a sequence diagram of one example of details of the processing of the JDF-PDL conversion function part 82 and the PDL transmission function part 83. In step S21, the PDL transmission function part 83 sets up the JDF-PDL conversion function part 82. In step S22, the JDF-PDL conversion function part 82 requests the JDF conversion module 91 to obtain the JDF converted data 1100.

In step S23, the JDF conversion module 91 derives the JDF converted data 1100. In step S24, the JDF conversion module 91 returns the JDF converted data 1100 to the JDF-PDL conversion function part 82.

The PDL transmission function part 83 repeats processing of steps S25 through S36 until the command language strings 800 can no longer be obtained. In step S25, the PDL transmission function part 83 requests the JDF-PDL conversion function part 82 to obtain the command language string 800.

In step S26, the JDF-PDL conversion function part 82 requests the PDL extraction module 92 to obtain the command language string 710. In step S27, the PDL extraction module 92 derives the command language string 710. In step S28, the PDL extraction module 92 returns the command language string 710 to the JDF-PDL conversion function part 82.

The JDF-PDL conversion function part 82 carries out processing of steps S29 through S31 in a case where the command language string 710 is a part to reflect the printing parameter of JDF 500. In the case where the command language string 710 is a part that reflects the printing parameter of JDF 500, the JDF-PDL conversion function part 82 requests the PDL conversion module 93 to obtain the command language string 900, in step S29.

In step S30, the PDL conversion module 93 derives the command language string 900. In step S31, the PDL conversion module 93 returns the command language string 900 to the JDF-PDL conversion function part 82.

It is noted that the part that reflects the printing parameter of JDF 500 is, for example, a header or a footer of a printer job language (PJL), a beginning function ("%% BeginFeature" or the like) comment header of PDL, an ending function ("%% EndFeature" or the like) comment header of PDL, or the like.

In step S32, the JDF-PDL conversion function part 82 requests the PDL derivation module 94 to obtain the command language string 800. In step S33, the PDL derivation module 94 derives the command language string 800. In step S34, the PDL derivation module 94 returns the command language string 800 to the JDF-PDL conversion function part 82.

In step S35, the JDF-PDL conversion function part 82 returns the command language string 800 to the PDL transmission function part 83. In step S36, the PDL transmission function part 83 transmits the command language string 800 to the printer apparatus 14.

Details of the processing in step S23 are as follows. First, the JDF conversion module 91 generates (a variable of) the JDF converted data 1100. Then, the JDF conversion module 91 repeats the following processing the number of times corresponding to the number of the JDF associated elements 1010 that the JDF conversion table 95 has.

The JDF conversion module 91 obtains the JDF parameter ID 1020 from the JDF associated element 1010. The JDF conversion module 91 repeats the following processing the number of times corresponding to the number of the JDF element paths 1030 that the JDF associated element 1010 has, in the order of the priorities 1040.

The JDF conversion module 91 obtains the JDF element 1120 corresponding to the JDF element path 1030 from JDF 500. In a case where the corresponding JDF element 1120 exists, the JDF conversion module 91 generates the JDF converted element 1110 from the JDF parameter ID 1020 and the JDF element 1120, and appends the JDF converted element 1110 to (the variable of) the JDF converted data 1100.

After repeating the above-mentioned processing the number of times corresponding to the number of the JDF associated elements 1010 that the JDF conversion table 95 has, the JDF conversion module 91 returns the JDF converted data 1100 to the JDF-PDL conversion function part 82.

Details of the processing in step S30 are as follows. First, the PDL conversion module 93 generates (a variable of) the command language string 900. Then, the PDL conversion module 93 repeats the following processing the number of times corresponding to the number of the printing function tables 1210 that the PDL conversion table 96 has.

The PDL conversion module 93 obtains the JDF reflection part 1230 that the printing function table 1210 has. In a case where the part at which the command language string 710 is to reflect PDF of JDF 500 coincides with the JDF reflection part 1230 that the printing function table 1210 has, the PDL conversion module 93 carries out the following processing.

The PDL conversion module 93 repeats the following processing the number of times corresponding to the number of the printing setting tables 1220 that the printing function table 1210 has. The PDL conversion module 93 carries out the following processing in order to obtain a determination result as to whether the JDF converted data 1100 fills all the printing condition tables 1240 that the printing setting table 1220 has.

The PDL conversion module 93 repeats the following processing the number of times corresponding to the number of the printing condition tables 1240 that the printing setting table 1220 has. The PDL conversion module 93 carries out the following processing in order to obtain a determination result as to whether the printing condition table 1240 coincides with any one of the JDF converted elements 1110 that the JDF converted data 1100 has.

The PDL conversion module 93 repeats the following processing the number of times corresponding to the number of the JDF converted elements 1110 that the JDF converted data 1100 has. The PDL conversion module 93 obtains a determination result that "the printing condition table 1240 coincides with any one of the JDF converted elements 1110 that the JDF converted data 1100 has", in a case where the JDF parameter ID 1020 and the JDF element 1110 that the printing condition table 1240 has coincides with the JDF parameter ID 1020 and the JDF element 1120 that the JDF converted element 1110 has, respectively. Then, the PDL conversion module 93 terminates the repetitions of the processing corresponding to the number of the JDF converted elements 1110 that the JDF converted data 1100 has.

On the other hand, the PDL conversion module 93 obtains a determination result that "the printing condition table 1240 does not coincide with any one of the JDF converted elements 1110 that the JDF converted data 1100 has", in a case where the JDF parameter ID 1020 and the JDF element 1110 that the printing condition table 1240 has do not coincide with the JDF parameter ID 1020 and the JDF element 1120 that JDF converted element 1110 has, respectively. Then, the PDL conversion module 93 continues the repetitions of the processing the number of times corresponding to the number of the JDF converted elements 1110 that the JDF converted data 1100 has.

When having thus terminated or thus finished the repetitions of the processing corresponding to the number of the JDF converted elements 1110 that the JDF converted data 1100 has, the determination result that the PDL conversion module 93 has thus finally obtained is the determination result that "the printing condition table 1240 coincides with any one of the JDF converted elements 1110 that the JDF converted data 1100 has" or the determination result that "the printing condition table 1240 does not coincide with any one of the JDF converted elements 1110 that the JDF converted data 1100 has". In the case where the determination result is that "the printing condition table 1240 does not coincide with any one of the JDF converted elements 1110 that the JDF converted data 1100 has", the PDL conversion module 93 obtains the determination result that "the JDF converted data 1100 does not fill all the printing condition tables 1240 that the printing setting table 1220 has". Then, the PDL conversion module 93 terminates the repetitions of the processing corresponding to the number of the printing condition tables 1240 that the printing condition table 1220 has.

On the other hand, in the case where the determination result that "the printing condition table 1240 coincides with any one of the JDF converted elements 1110 that the JDF converted data 1100 has" has been finally obtained, the PDL conversion module 93 obtains the determination result that "the JDF converted data 1100 fills all the printing condition tables 1240 that the printing setting table 1220 has". Then, the PDL conversion module 93 continues the repetitions of the processing the number of times corresponding to the number of the printing condition tables 1240 that the printing condition table 1220 has.

When thus having terminated or finished the repetitions of the processing corresponding to the number of the printing condition tables 1240 that the printing condition table 1220 has, the determination result that the PDL conversion module 93 has finally obtained is the determination result that "the JDF converted data 1100 does not fill all of the printing condition tables 1240 that the printing setting table 1220 has" or the determination result that "the JDF converted data 1100 fills all of the printing condition tables 1240 that the printing setting table 1220 has".

The PDL conversion module 93 obtains the printing setting command language string template 1250 that the printing setting table 1220 has, in the case where the finally obtained determination result is the determination result that "the JDF converted data 1100 fills all of the printing condition tables 1240 that the printing setting table 1220 has".

The PDL conversion module 93 derives the printing setting command language string 1300 from the printing setting command language string template 1250. The PDL conversion module 93 appends the printing setting command language string 1300 to (the variable of) the command language string 900.

After repeating the above-mentioned processing the number of times corresponding to the number of the printing function tables 1210 that the PDL conversion table 96 has, the PDL conversion module 93 returns the command language string 900 to the JDF-PDL conversion function part 82 (step S31).

Details of the processing in step S33 are as follows. First, the PDL derivation module 94 generates (a variable of) the command language string 800. The PDL derivation module 94 appends the command language string 710 to (the variable of) the command language string 800. In a case where the command language string 900 exists, the PDL derivation module 94 appends the command language string 900 to the command language string 800. The PDL derivation module 94 returns the command language string 800 to the JDF-PDL conversion function part 82.

It is noted that the above-described processing is one example in which each command language string 800 may include one command language string 900. In contrast thereto, it is also possible that each command language string 800 may include plural command language strings 900. In this case, the above-mentioned processing of the PDL conversion module 93 generating (a variable of) the command language string 900 is carried out before the above-mentioned processing of The PDL conversion module 93 obtaining the JDF reflection part 1230 that the printing function table 1210 has. Also, the above-mentioned processing of step S31 of the PDL conversion module 93 returning the command language string 900 to the JDF-PDL conversion function part 82 is included in the processing of step S30 and is carried out after the above-mentioned processing of the PDL conversion module 93 appending the printing setting command language string 1300 to (the variable of) the command language string 900.

<Summary of Embodiment>

According to the embodiment of the present invention, when the command language string 800 that is the disassembled printing output data has been derived, the derived command language string 800 is transmitted to the printer apparatus 14, without waiting for the completion of the conversion of all of the printing output data. Therefore, it is possible to shorten FPOT.

A first conversion function part corresponds to the printing data conversion function part 81, a second conversion function part corresponds to the JDF-PDL conversion function part 82, a transmission function part corresponds to the PDL transmission function part 83, a first conversion part corresponds to the JDF conversion module 91, an extraction part corresponds to the PDL extraction module 92, a second conversion part corresponds to the PDL conversion module 93, a derivation part corresponds to the PDL derivation module 94, an element conversion part corresponds to the JDF conversion table 95, and an inserting data conversion part corresponds to the PDL conversion table 96.

The present invention is not limited to the specifically disclosed embodiments, and variations and modifications may be made without departing from the scope of the present invention.

The present Patent Application is based on Japanese Priority Patent Application No. 2011-020218, filed Feb. 1, 2011, and Japanese Priority Patent Application No. 2012-010242, filed Jan. 20, 2012, the entire contents of which are hereby incorporated herein by reference.

What is claimed is:

1. A non-transitory computer readable information recording medium storing a printing control program which when executed by one or plural processors, carries out functions of:
- a first conversion function part configured to derive data of a form of page description language converted from printing data, based on the printing data;
- a second conversion function part configured to disassemble the data of the form of page description language converted from the printing data and data to be inserted into the data of the form of page description language converted from the printing data, and derive disassembled printing output data, based on data of a form of job definition format associated with the printing data and the data of the form of page description language converted from the printing data; and
- a transmission function part configured to transmit the disassembled printing output data to a printer apparatus, wherein
- the second conversion function part is configured to include;
  - a first conversion part configured to derive, using a first conversion table, converted data including one or more converted elements, based on the data of the form of job definition format associated with the printing data;
  - an extraction part configured to disassemble the data of the form of page description language converted from the printing data;
  - a second conversion part configured to derive, using a second conversion table, the data to be inserted into the data of the form of page description language converted from the printing data having been disassembled, based on the data of the form of page description language converted from the printing data having been disassembled by the extraction part and the converted data including the one or more converted elements; and
  - a derivation part configured to append the data to be inserted into the data of the form of page description language converted from the printing data having been disassembled, to the data of the form of page description language converted from the printing data having been disassembled, and derive the disassembled printing output data.

2. The non-transitory computer readable information recording medium as claimed in claim 1, wherein
the transmission function part is configured to transmit the disassembled printing output data to the printer apparatus without waiting for a completion of deriving of all the disassembled printing output data corresponding to the printing data carried out by the second conversion function part.

3. The non-transitory computer readable information recording medium as claimed in claim 1, wherein
the second conversion part is configured to use the second conversion table configured to derive, as the data to be inserted into the data of the form of page description language converted from the printing data, the converted data including one or more converted elements.

4. The non-transitory computer readable information recording medium as claimed in claim 1, wherein
the disassembled printing output data includes command language strings extracted by line from the data of the form of page description language converted from the printing data.

5. A printing control method, comprising:
- deriving, by one or more processors, data of a form of page description language converted from printing data, based on the printing data;
- disassembling, by one or more processors, the data of the form of page description language converted from the printing data and data to be inserted into the data of the form of page description language converted from the printing data, and deriving, by the one or more processors, disassembled printing output data, based on data of a form of job definition format associated with the printing data and the data of the form of page description language converted from the printing data; and
- transmitting, by one or more processors, the disassembled printing output data to a printer apparatus, wherein
- the disassembling includes:
  - deriving, using a first conversion table, converted data including one or more converted elements, based on the data of the form of job definition format associated with the printing data;
  - disassembling the data of the form of page description language converted from the printing data;
  - deriving, using a second conversion table, the data to be inserted into the data of the form of page description language converted from the printing data having been disassembled, based on the data of the form of page description language converted from the printing data having been disassembled by the extraction part and the converted data including the one or more converted elements; and
  - appending the data to be inserted into the data of the form of page description language converted from the printing data having been disassembled, and derive the disassembled printing output data.

6. A printing system comprising:
a printer apparatus; and
a printing control apparatus, configured to control the printer apparatus, and execute the printing control method claimed in claim 5.

7. A non-transitory computer readable information recording medium storing a printing control program which when executed by one or plural processors, carries out functions of:
- a first conversion function part configured to derive data of a form of page description language converted from printing data, based on the printing data;
- a second conversion function part configured to disassemble the data of the form of page description language converted from the printing data and data to be inserted into the data of the form of page description language converted from the printing data, and derive disassembled printing output data, based on data of a form of job definition format associated with the printing data and the data of the form of page description language converted from the printing data; and
- a transmission function part configured to transmit the disassembled printing output data to a printer apparatus, wherein
- the second conversion function part is configured to include;

a first conversion part configured to derive, using a first conversion table, converted data including one or more converted elements, based on the data of the form of job definition format associated with the printing data;

an extraction part configured to disassemble the data of the form of page description language converted from the printing data;

a second conversion part configured to derive, using a second conversion table, the data to be inserted into the data of the form of page description language converted from the printing data having been disassembled, based on the data of the form of page description language converted from the printing data having been disassembled by the extraction part and the converted data including the one or more converted elements; and a derivation part configured to append the data to be inserted into the data of the form of page description language converted from the printing data having been disassembled, to the data of the form of page description language converted from the printing data having been disassembled, and derive the disassembled printing output data, and the first conversion part is configured to use the first conversion table configured to convert an element included in the data of the form of job definition format, and append, when the element specified in the first conversion table exists in the data exists in the data of the form of job definition format associated with the printing data, the element specified in the first conversion table as the converted element.

8. The non-transitory computer readable information recording medium as claimed in claim 7, wherein
the transmission function part is configured to transmit the disassembled printing output data to the printer apparatus without waiting for a completion of deriving of all the disassembled printing output data corresponding to the printing data carried out by the second conversion function part.

9. The non-transitory computer readable information recording medium as claimed in claim 7, wherein
the second conversion part is configured to use the second conversion table configured to derive, as the data to be inserted into the data of the form of page description language converted from the printing data, the converted data including one or more converted elements.

10. The non-transitory computer readable information recording medium as claimed in claim 7, wherein
the disassembled printing output data includes command language strings extracted by line from the data of the form of page description language converted from the printing data.

11. The non-transitory computer readable information recording medium as claimed in claim 1, wherein
the first conversion table includes one or more job definition format associated elements, each of the job definition format associated elements including one job definition format parameter identifier and one or more job definition format element paths, each of the job definition format element paths including one priority, and the job definition format element paths being paths indicating positions according to a hierarchical structure prescribed in a job definition format standard for identifying respective elements included in the data of the form of job definition format, and the second conversion table includes one or more printing function tables, each of the printing function tables including one or more printing setting tables and one job definition format reflection part, each of the printing setting tables including one or more printing condition tables and one printing setting command language string template, and each of the printing condition tables including one job definition format parameter identifier and one element included in the data of the form of job definition format.

12. The printing control method, as claimed in claim 5, wherein
the first conversion table includes one or more job definition format associated elements, each of the job definition format associated elements including one job definition format parameter identifier and one or more job definition format element paths, each of the job definition format element paths including one priority, and the job definition format element paths being paths indicating positions according to a hierarchical structure prescribed in a job definition format standard for identifying respective elements included in the data of the form of job definition format, and the second conversion table includes one or more printing function tables, each of the printing function tables including one or more printing setting tables and one job definition format reflection part, each of the printing setting tables including one or more printing condition tables and one printing setting command language string template, and each of the printing condition tables including one job definition format parameter identifier and one element included in the data of the form of job definition format.

13. The non-transitory computer readable information recording medium as claimed in claim 7, wherein
the first conversion table includes one or more job definition format associated elements, each of the job definition format associated elements including one job definition format parameter identifier and one or more job definition format element paths, each of the job definition format element paths including one priority, and the job definition format element paths being paths indicating positions according to a hierarchical structure prescribed in a job definition format standard for identifying respective elements included in the data of the form of job definition format, and the second conversion table includes one or more printing function tables, each of the printing function tables including one or more printing setting tables and one job definition format reflection part, each of the printing setting tables including one or more printing condition tables and one printing setting command language string template, and each of the printing condition tables including one job definition format parameter identifier and one element included in the data of the form of job definition format.

* * * * *